(12) United States Patent
Lee et al.

(10) Patent No.: US 11,924,868 B2
(45) Date of Patent: Mar. 5, 2024

(54) METHOD AND APPARATUS FOR PERFORMING CARRIER (RE)SELECTION IN NR V2X

(71) Applicant: LG ELECTRONICS INC., Seoul (KR)

(72) Inventors: Seungmin Lee, Seoul (KR); Kyuhwan Kwak, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 566 days.

(21) Appl. No.: 17/257,474

(22) PCT Filed: Aug. 5, 2019

(86) PCT No.: PCT/KR2019/009725
§ 371 (c)(1),
(2) Date: Dec. 31, 2020

(87) PCT Pub. No.: WO2020/027637
PCT Pub. Date: Feb. 6, 2020

(65) Prior Publication Data
US 2021/0377956 A1    Dec. 2, 2021

Related U.S. Application Data

(60) Provisional application No. 62/714,108, filed on Aug. 3, 2018.

(51) Int. Cl.
*H04W 72/02* (2009.01)
*H04W 72/0453* (2023.01)
(Continued)

(52) U.S. Cl.
CPC ......... *H04W 72/541* (2023.01); *H04W 72/02* (2013.01); *H04W 72/0453* (2013.01); *H04W 72/56* (2023.01)

(58) Field of Classification Search
CPC . H04W 72/541; H04W 72/542; H04W 72/52; H04W 72/56; H04W 72/0453
See application file for complete search history.

(56) References Cited

U.S. PATENT DOCUMENTS 6,442,164 B1 * 8/2002 Wu ..................... H04Q 11/0478
370/395.21
6,584,111 B1 * 6/2003 Aweya ................ H04L 49/3081
370/232

(Continued)

FOREIGN PATENT DOCUMENTS

WO    2017150958    9/2017

OTHER PUBLICATIONS

PCT International Application No. PCT/KR2019/009725, International Search Report dated Nov. 8, 2019, 4 pages.

(Continued)

*Primary Examiner* — Jean A Gelin
(74) *Attorney, Agent, or Firm* — LEE, HONG, DEGERMAN, KANG & WAIMEY

(57) ABSTRACT

Provided are a method for performing sidelink communication by a first apparatus (100) and an apparatus supporting same. The method may comprise the steps of: performing channel busy ratio (CBR) measurement on at least one bandwidth part (BWP) associated with a first sidelink service, among a plurality of BWPs included in a first carrier; and determining a CBR value of the first carrier, on the basis of the measured CBR value of at least one BWP associated with the first sidelink service.

14 Claims, 31 Drawing Sheets

(51) Int. Cl.
*H04W 72/541* (2023.01)
*H04W 72/56* (2023.01)

(56) References Cited

U.S. PATENT DOCUMENTS

| | | | | |
|---|---|---|---|---|
| 2016/0301957 | A1* | 10/2016 | McCarthy | H04N 21/23655 |
| 2017/0094543 | A1* | 3/2017 | Narasimha | H04W 24/10 |
| 2019/0104489 | A1* | 4/2019 | Huang | H04W 8/24 |
| 2019/0306911 | A1* | 10/2019 | Hahn | H04W 72/20 |
| 2020/0359251 | A1* | 11/2020 | Gunnarsson | H04W 24/10 |
| 2021/0289507 | A1* | 9/2021 | Wang | H04W 72/54 |

OTHER PUBLICATIONS

Huawei, et al., "Summary of remaining issues on bandwidth part and wideband operation", 3GPP TSG RAN WG1 Meeting #92, R1-1801347, Feb. 2018, 15 pages.

Intel, "Sidelink Carrier Aggregation for Mode-4 LTE V2V Communication", 3GPP TSG RAN WG1 Meeting #90bis, R1-1717330, Oct. 2017, 10 pages.

Intel, "Details of congestion control for V2V communication", 3GPP TSG RAN WG1 Meeting #88, R1-1702142, Feb. 2017, 9 pages.

Ericsson, "Sidelink Carrier Selection Criteria for TX", 3GPP TSG RAN WG2 Meeting #101, R2-1803528, Feb. 2018, 7 pages.

* cited by examiner

FIG. 9
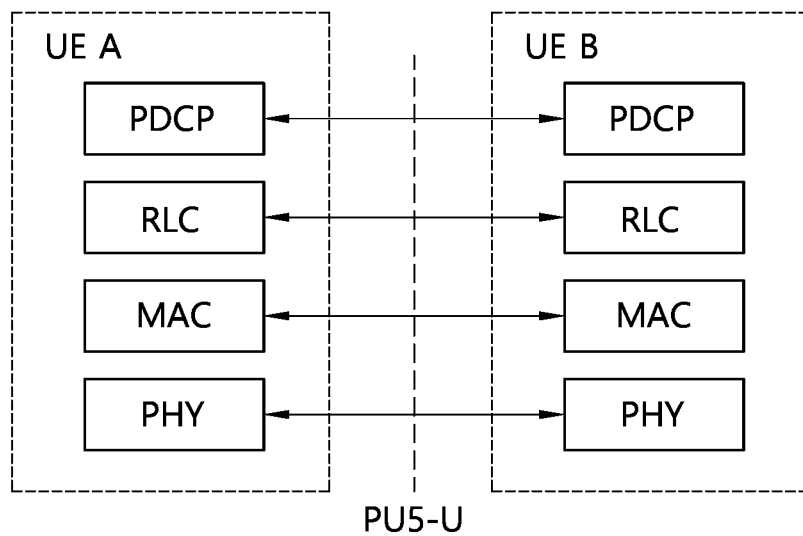
(a)
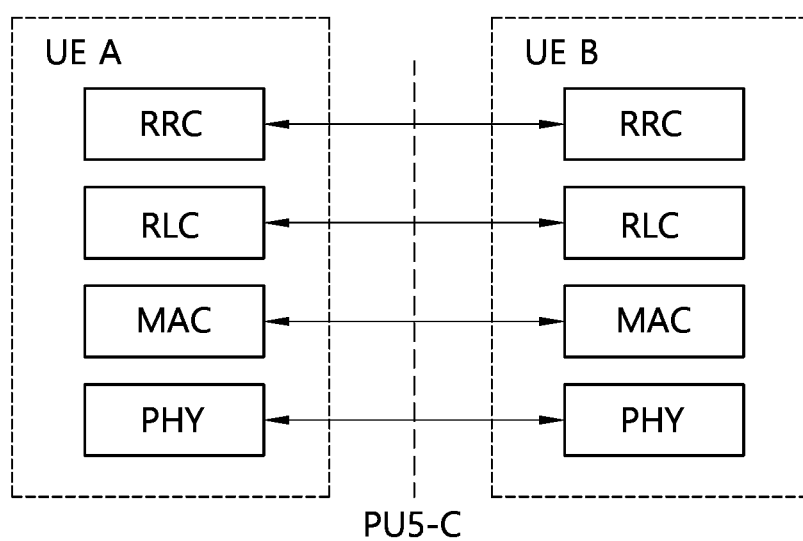
(b)

FIG. 10
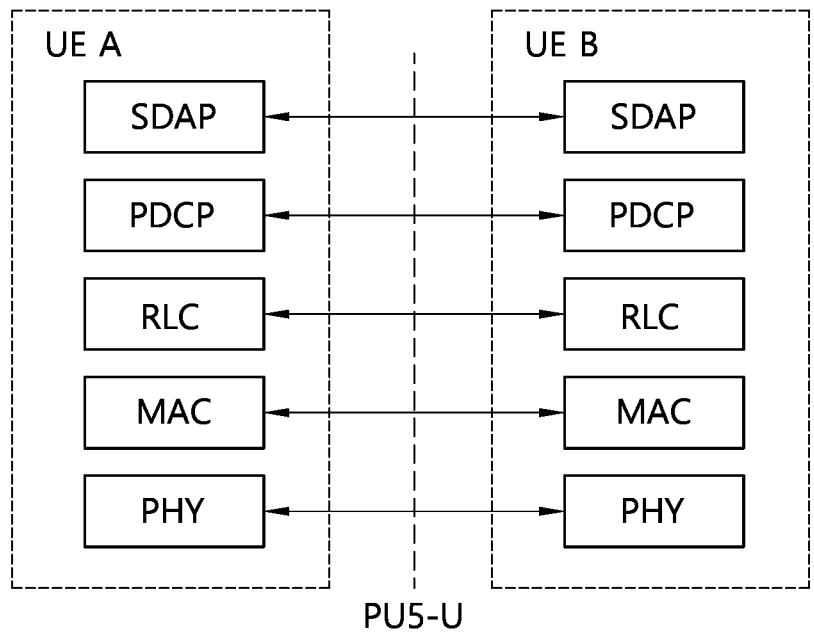
(a)
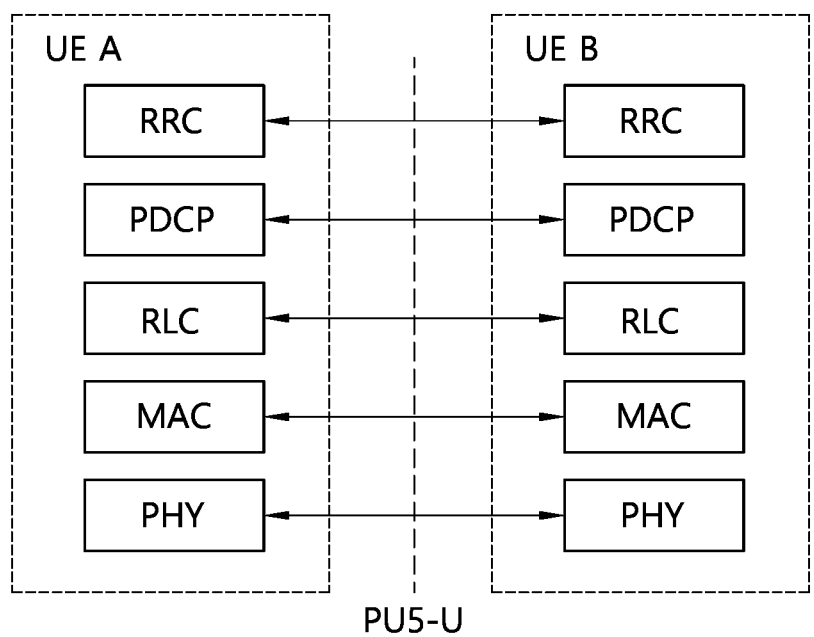
(b)

METHOD AND APPARATUS FOR PERFORMING CARRIER (RE)SELECTION IN NR V2X

CROSS-REFERENCE TO RELATED APPLICATIONS

This application is the National Stage filing under 35 U.S.C. 371 of International Application No. PCT/KR2019/009725, filed on Aug. 5, 2019, which claims the benefit of U.S. Provisional Application No. 62/714,108, filed on Aug. 3, 2018, the contents of which are all incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirement areas of 5G include (1) enhanced mobile broadband (eMBB) domain, (2) massive machine type communication (mMTC) area, and (3) ultra-reliable and low latency communications (URLLC) area. Some usage cases may require multiple areas for optimization and, other usage cases may only focus on only one key performance indicator (KPI). 5G is to support these various usage cases in a flexible and reliable way.

eMBB focuses on across-the-board enhancements to the data rate, latency, user density, capacity and coverage of mobile broadband access. The eMBB aims approximately 10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special usage case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another usage case is augmented reality and information retrieval for entertainment. Here, augmented reality requires very low latency and instantaneous data amount.

mMTC is designed to enable communication between devices that are low-cost, massive in number and battery-driven, intended to support applications, such as smart metering, logistics, and field and body sensors. mMTC aims approximately 10 years on battery and/or approximately 1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims approximately 1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of usage cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4 K or more (6 K, 8 K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many usage cases for mobile communications to vehicles. For example, entertainment for passengers demands high capacity and high mobile broadband at the same time. This is because future users will continue to expect high-quality connections regardless of their location and speed. Another usage case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters, such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important usage cases of mobile communications that enable tracking of inventory and packages anywhere using location-based information systems. Usage cases of logistics and freight tracking typically require low data rates, but require a large range and reliable location information.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in case of NR sidelink or NR V2X, a carrier may include multiple BWPs. Therefore, a user equipment (UE) needs to perform CBR measurement considering multiple BWPs. Furthermore, the UE needs to perform carrier (re)selection based on a CBR value of the carrier.

Technical Solutions

In an embodiment, provided herein is a method for performing, by a first device (100), sidelink communication. The method may include the steps of performing channel busy ratio (CBR) measurement for one or more bandwidth parts (BWPs) related to a first sidelink service, among one or more BWPs included in a first carrier, and determining a CBR value of the first carrier, based on CBR measurement values for one or more BWPs related to the first sidelink service.

In another embodiment, provided herein is a first device (100) performing sidelink communication. The first device (100) may include one or more memories, one or more transceivers, and one or more processors being operatively connected to the one or more memories and the one or more transceivers, wherein the one or more processors may be configured to perform channel busy ratio (CBR) measurement for one or more bandwidth parts (BWPs) related to a first sidelink service, among multiple BWPs included in a first carrier, and to determine a CBR value of the first carrier, based on CBR measurement values for one or more BWPs related to the first sidelink service.

Effects of the Disclosure

In sidelink communication, a UE may efficiently perform sidelink transmission on a plurality of BWPs.

BRIEF DESCRIPTION OF THE DRAWINGS

FIG. 9 shows a protocol stack for a sidelink communication to which the exemplary embodiment of the present disclosure can be applied.

FIG. 10 shows a protocol stack for a sidelink communication to which the exemplary embodiment of the present disclosure can be applied.

DESCRIPTION OF EXEMPLARY EMBODIMENTS

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
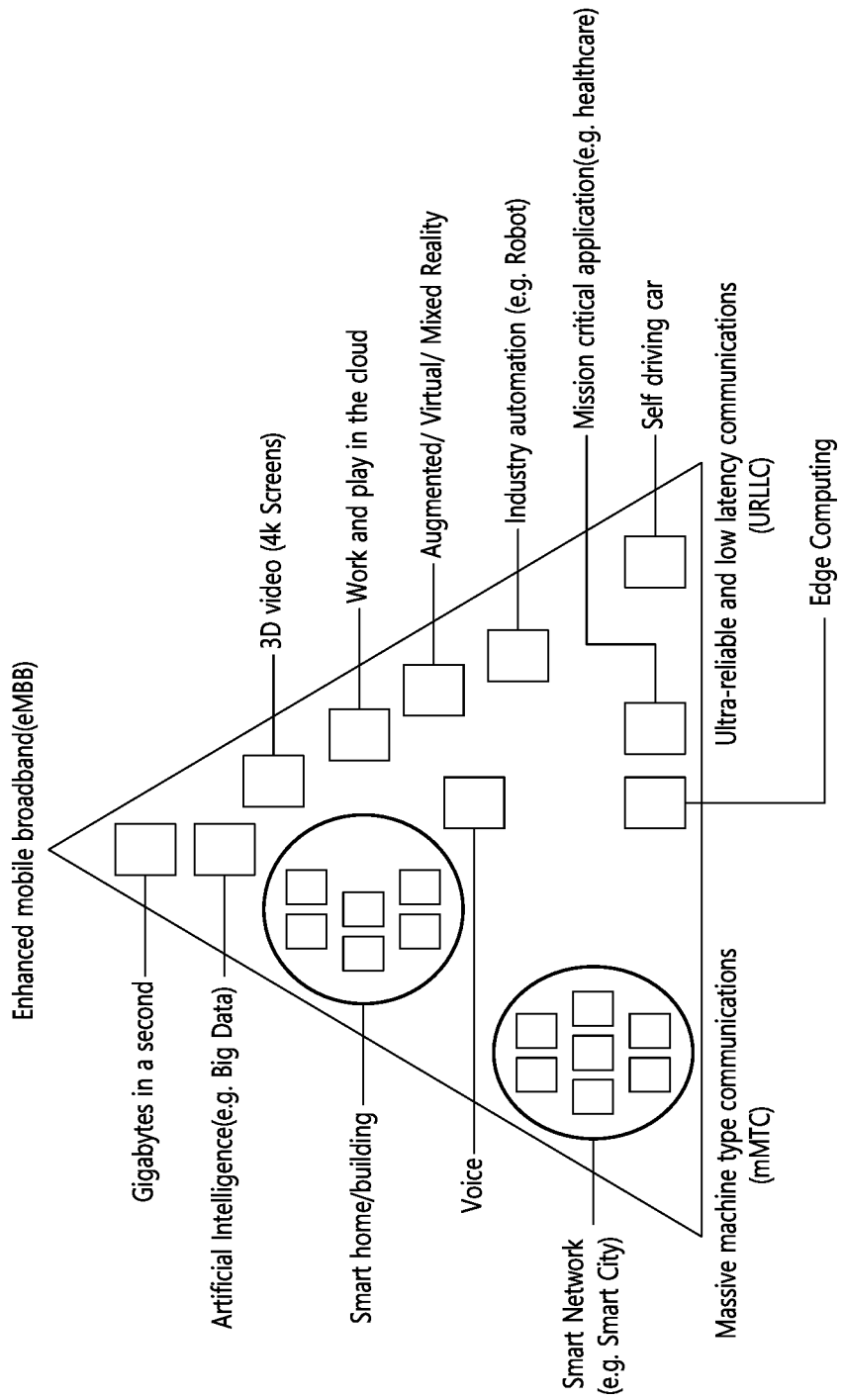
FIG. 1 shows examples of 5G usage scenarios to which the technical features of the present disclosure can be applied.
Figure 2:
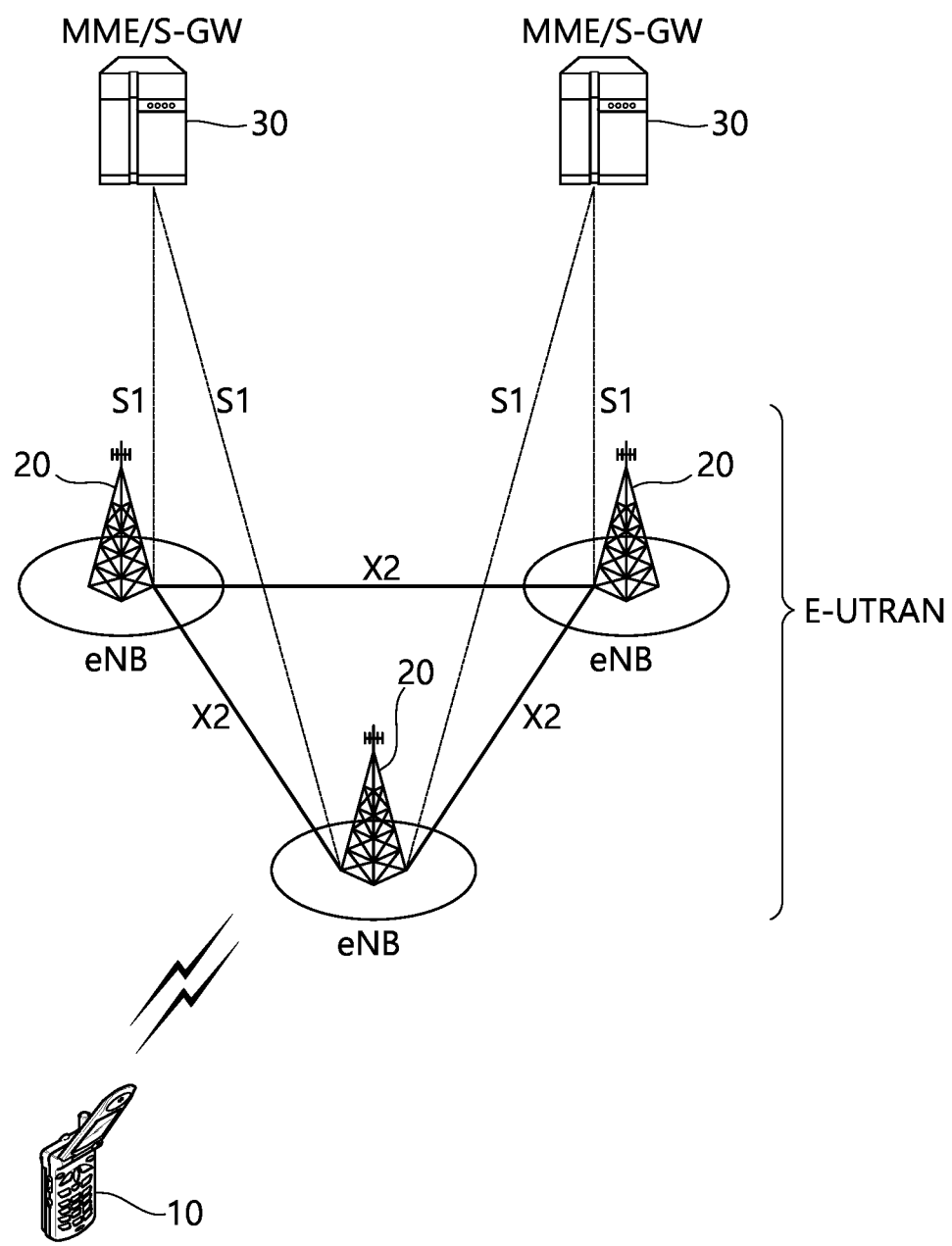
FIG. 2 shows a structure of an LTE system to which an exemplary embodiment of the present disclosure can be applied.

FIG. 2 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base stations (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 3:
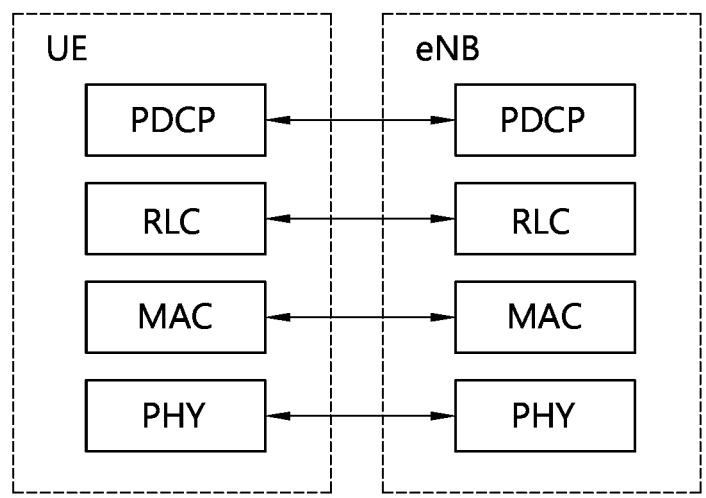
FIG. 3 shows a radio protocol architecture of a user plane to which an exemplary embodiment of the present disclosure can be applied.
Figure 4:
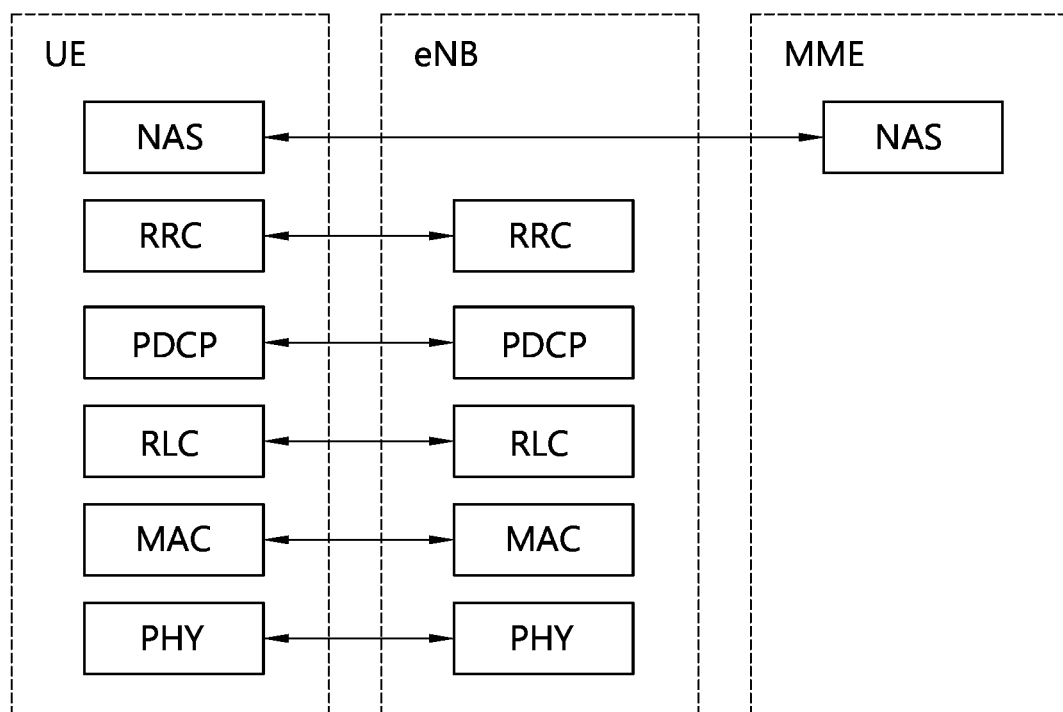
FIG. 4 shows a radio protocol architecture of a control plane to which an exemplary embodiment of the present disclosure can be applied.

FIG. 3 shows a radio protocol architecture of a user plane to which an exemplary embodiment of the present disclosure can be applied. FIG. 4 shows a radio protocol architecture of a control plane to which an exemplary embodiment of the present disclosure can be applied. The user plane is a protocol stack for user data transmission, and the control plane is a protocol stack for control signal transmission.

Referring to FIG. 3 and FIG. 4, a physical (PHY) layer belongs to the L1. A physical (PHY) layer provides an information transfer service to a high layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a high layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of subcarriers in the frequency domain. One subframe is configured of a plurality of OFDM symbols in the time domain. A resource block is configured of a plurality of OFDM symbols and a plurality of subcarriers in resource allocation units. Additionally, each subframe may use specific subcarriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 5:
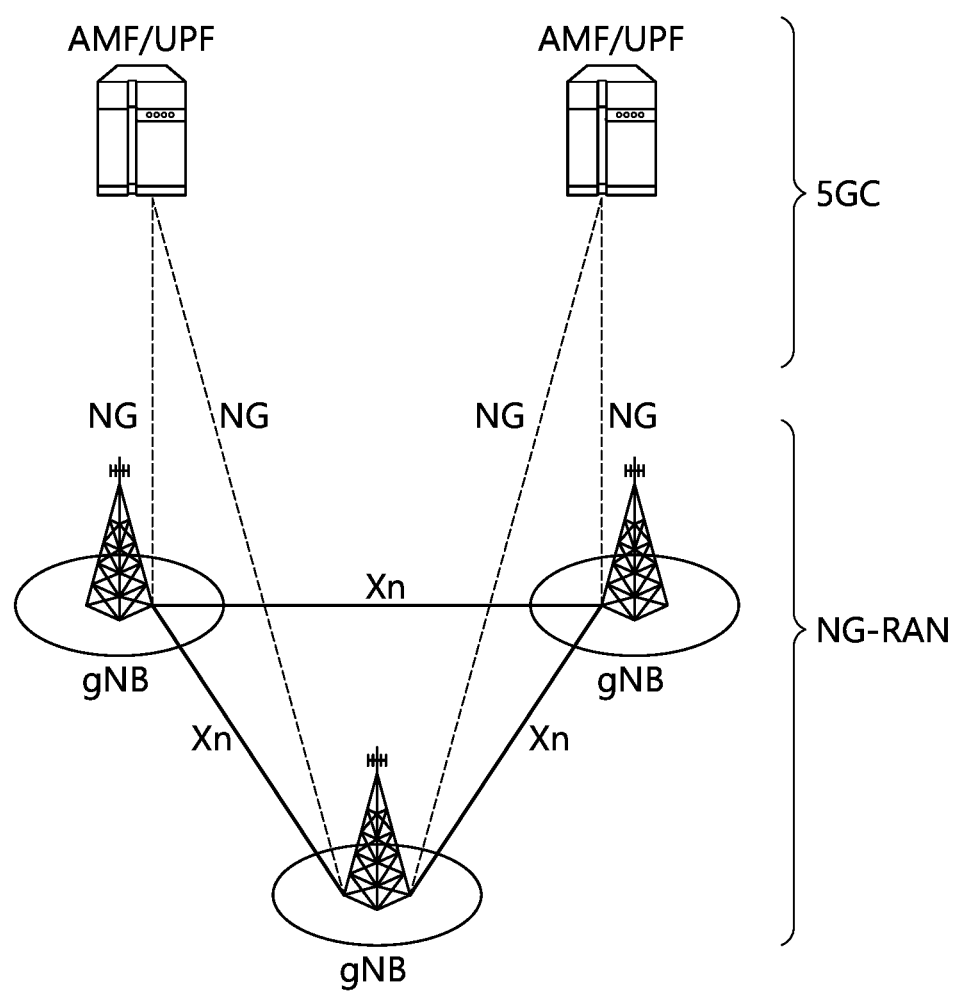
FIG. 5 shows a structure of an NR system to which an exemplary embodiment of the present disclosure can be applied.

FIG. 5 shows a structure of an NR system to which an exemplary embodiment of the present disclosure can be applied.

Referring to FIG. 5, an NG-RAN may include a gNB and/or eNB providing a user plane and control plane protocol termination to a user. FIG. 5 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
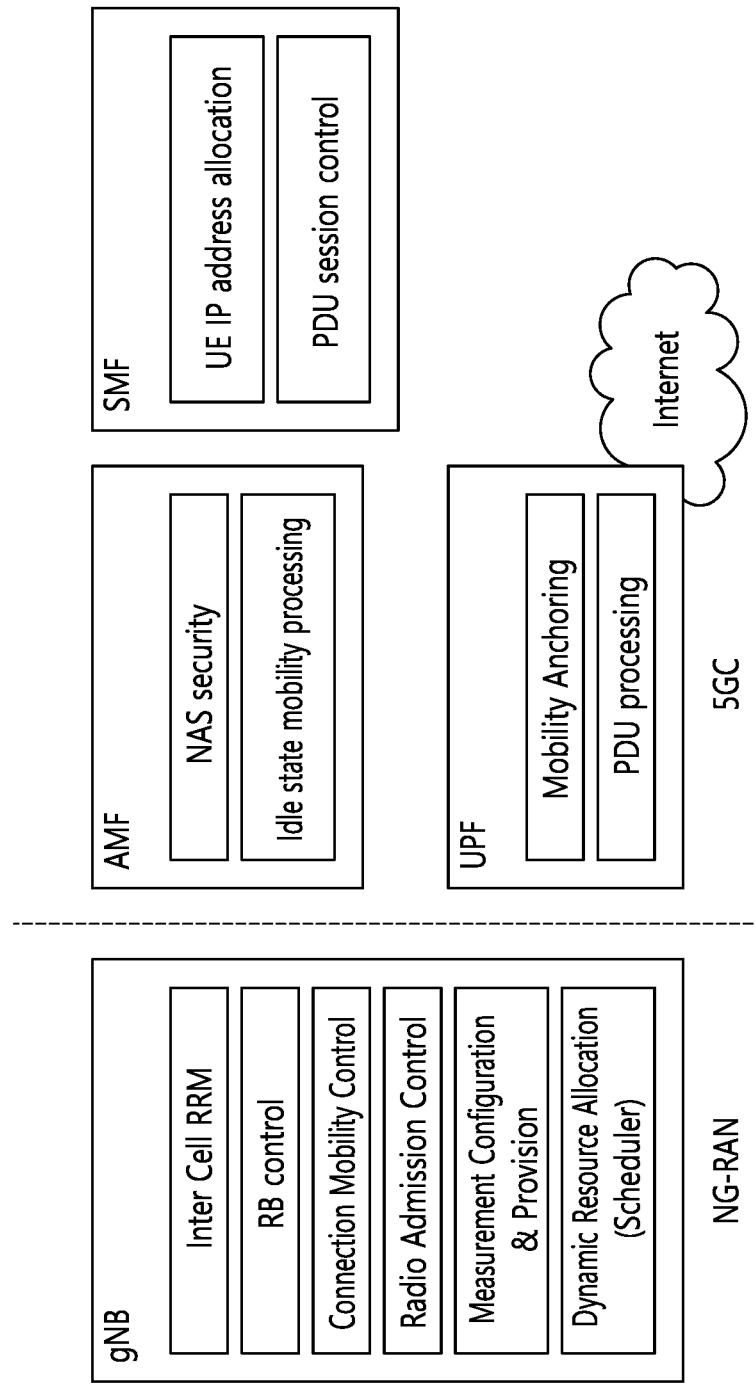
FIG. 6 shows a functional division between an NG-RAN and a 5GC to which an exemplary embodiment of the present disclosure can be applied.

FIG. 6 shows a functional division between an NG-RAN and a 5GC to which an exemplary embodiment of the present disclosure can be applied.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 7:
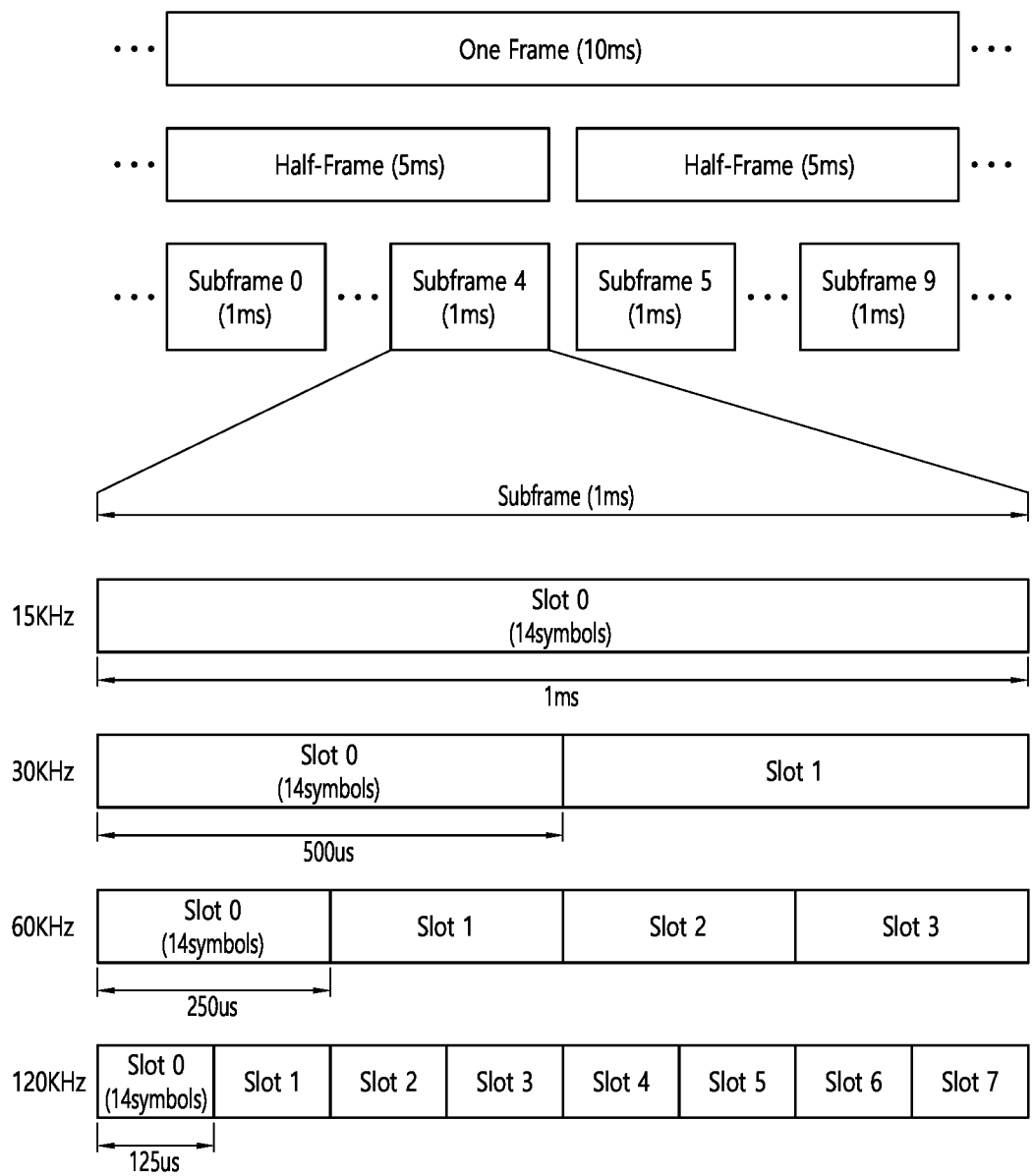
FIG. 7 shows a structure of a radio frame of an NR to which an exemplary embodiment of the present disclosure can be applied.

FIG. 7 shows a structure of a radio frame of an NR to which an exemplary embodiment of the present disclosure can be applied.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15 * $2^u$) | $N^{slot}_{symb}$ | $N^{frame,u}_{slot}$ | $N^{subframe,u}_{slot}$ |
|---|---|---|---|
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
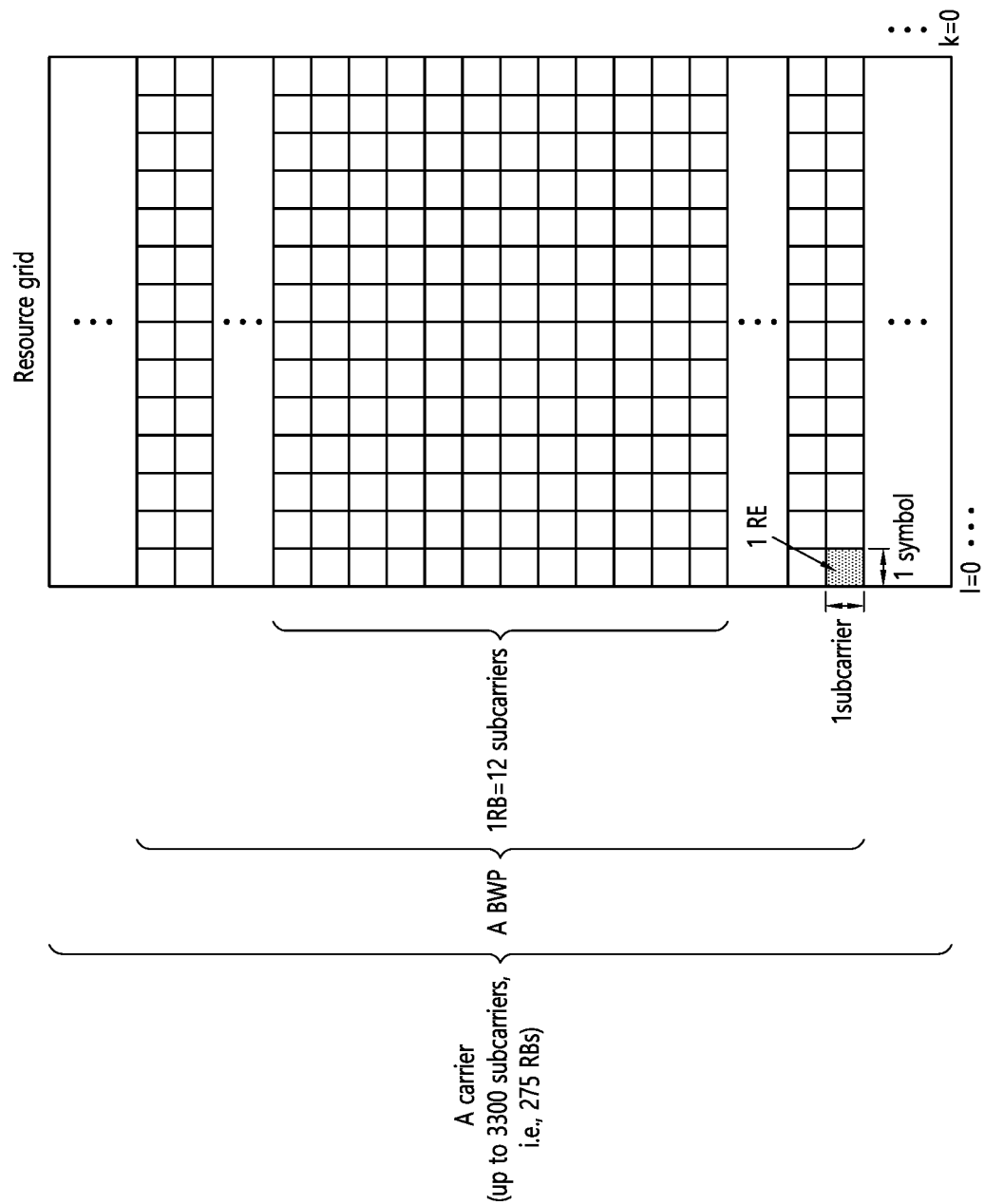
FIG. 8 shows a structure of a slot of an NR frame to which an exemplary embodiment of the present disclosure can be applied.

FIG. 8 shows a structure of a slot of an NR frame to which an exemplary embodiment of the present disclosure can be applied.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
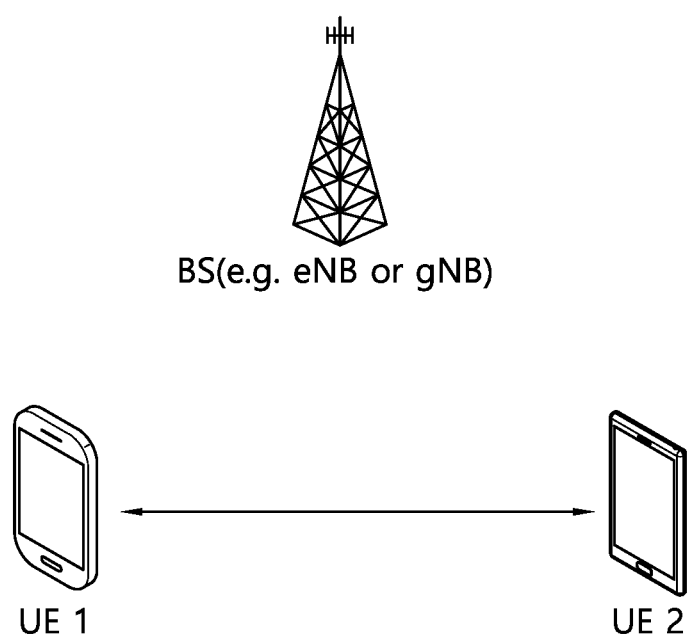
FIG. 11 shows a UE performing V2X or sidelink communication to which an exemplary embodiment of the present disclosure can be applied.

FIG. 11 shows a UE performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
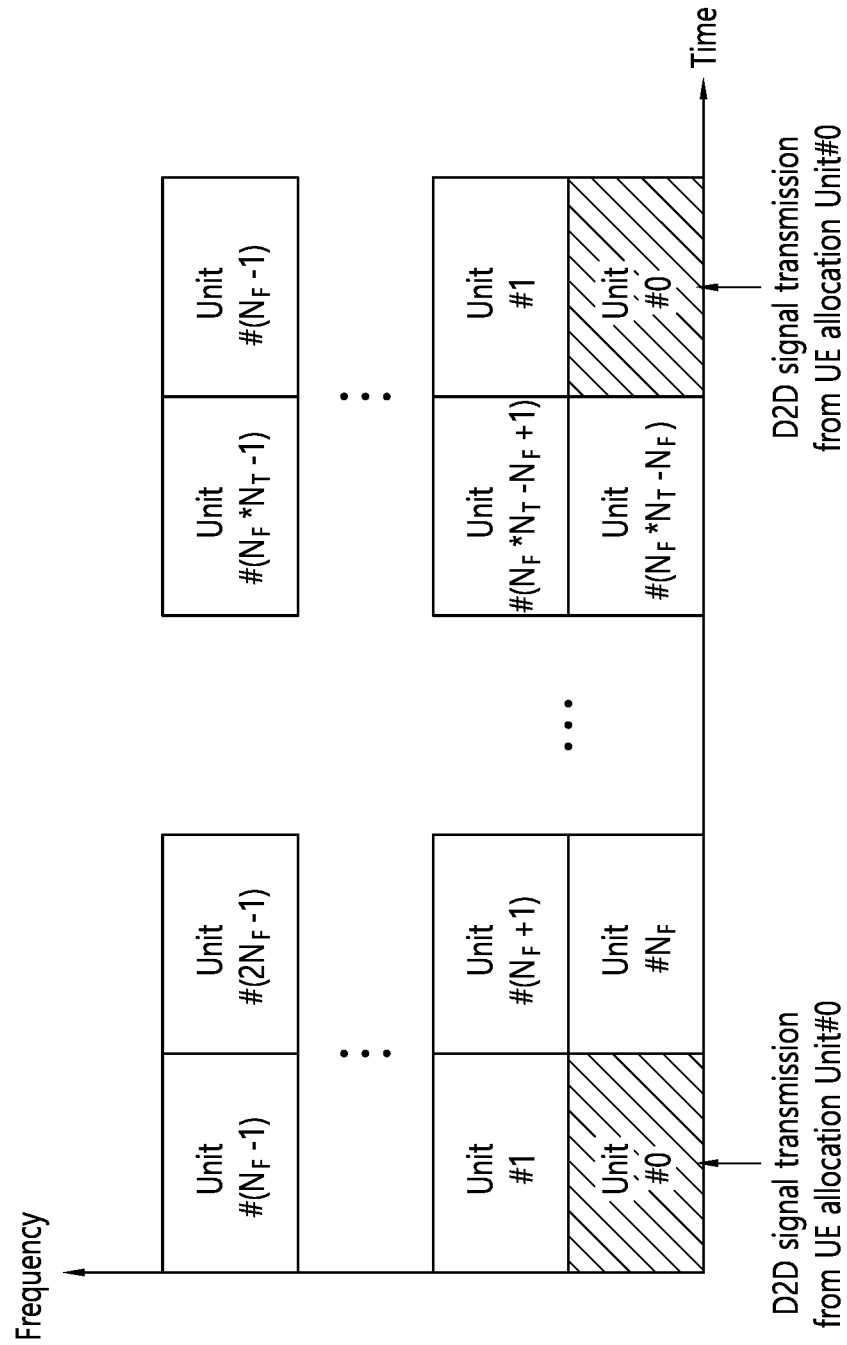
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
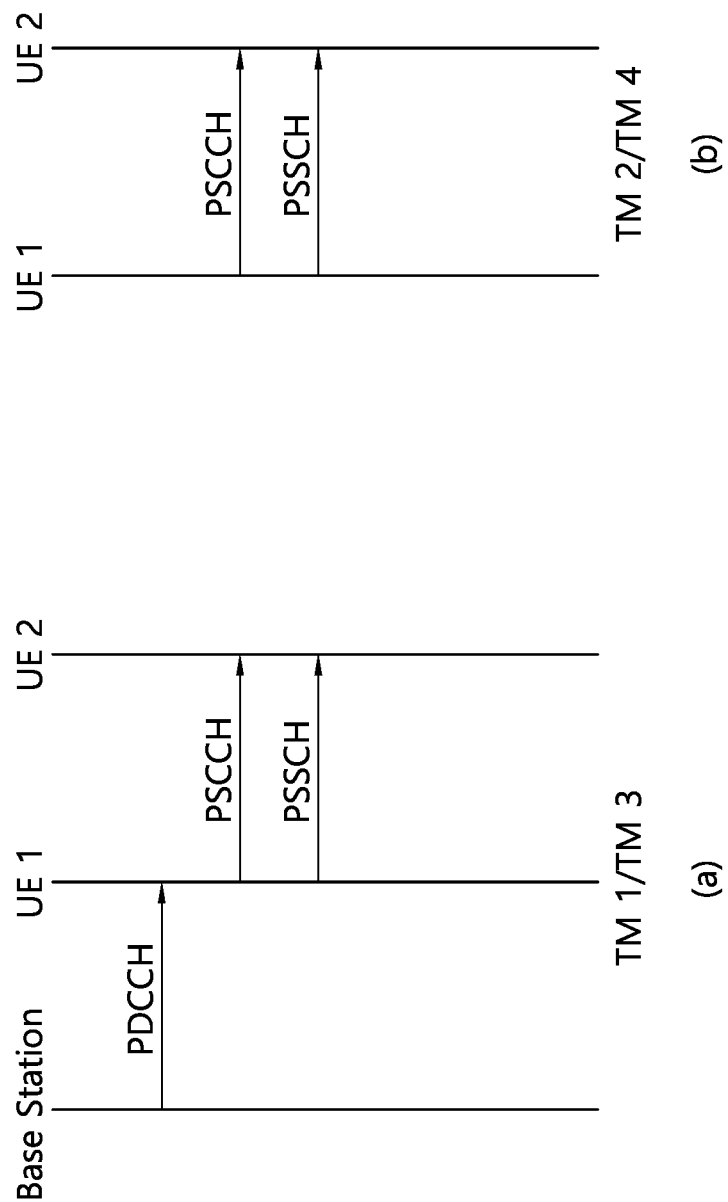
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 14:
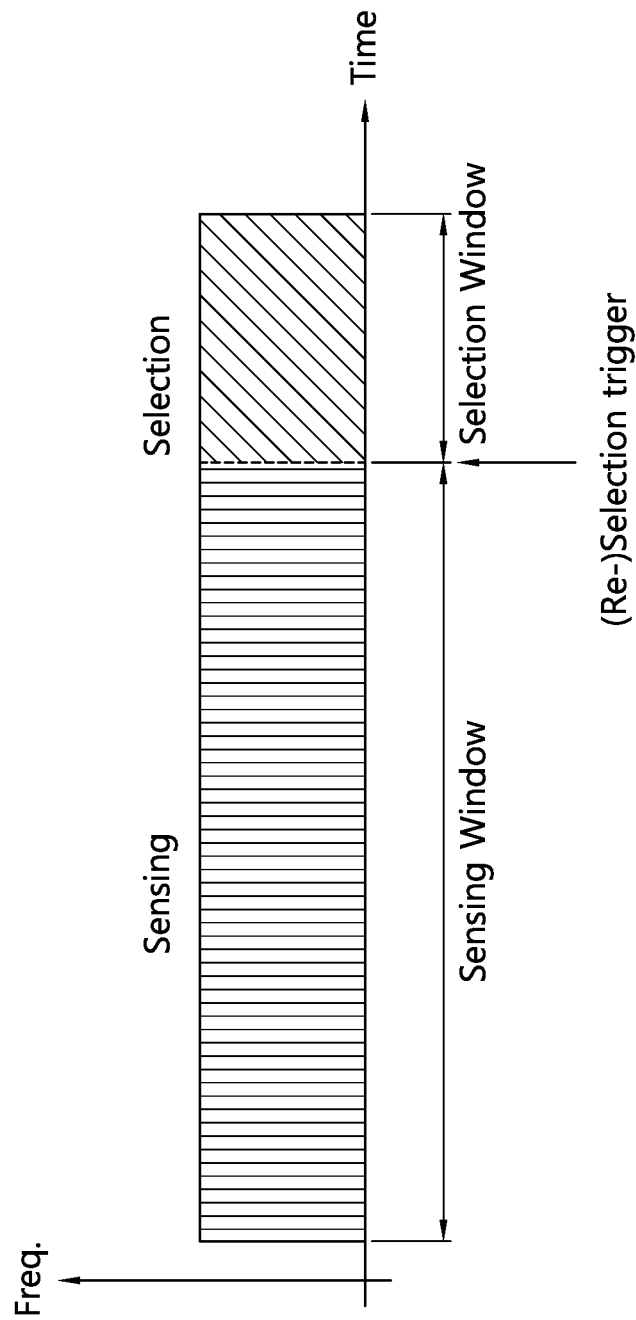
FIG. 14 shows an example where a transmission resource to which an exemplary embodiment of the present disclosure can be applied.

FIG. 14 shows an example where a transmission resource to which an exemplary embodiment of the present disclosure can be applied.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above-described methods.

Hereinafter, synchronization acquisition of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 15:
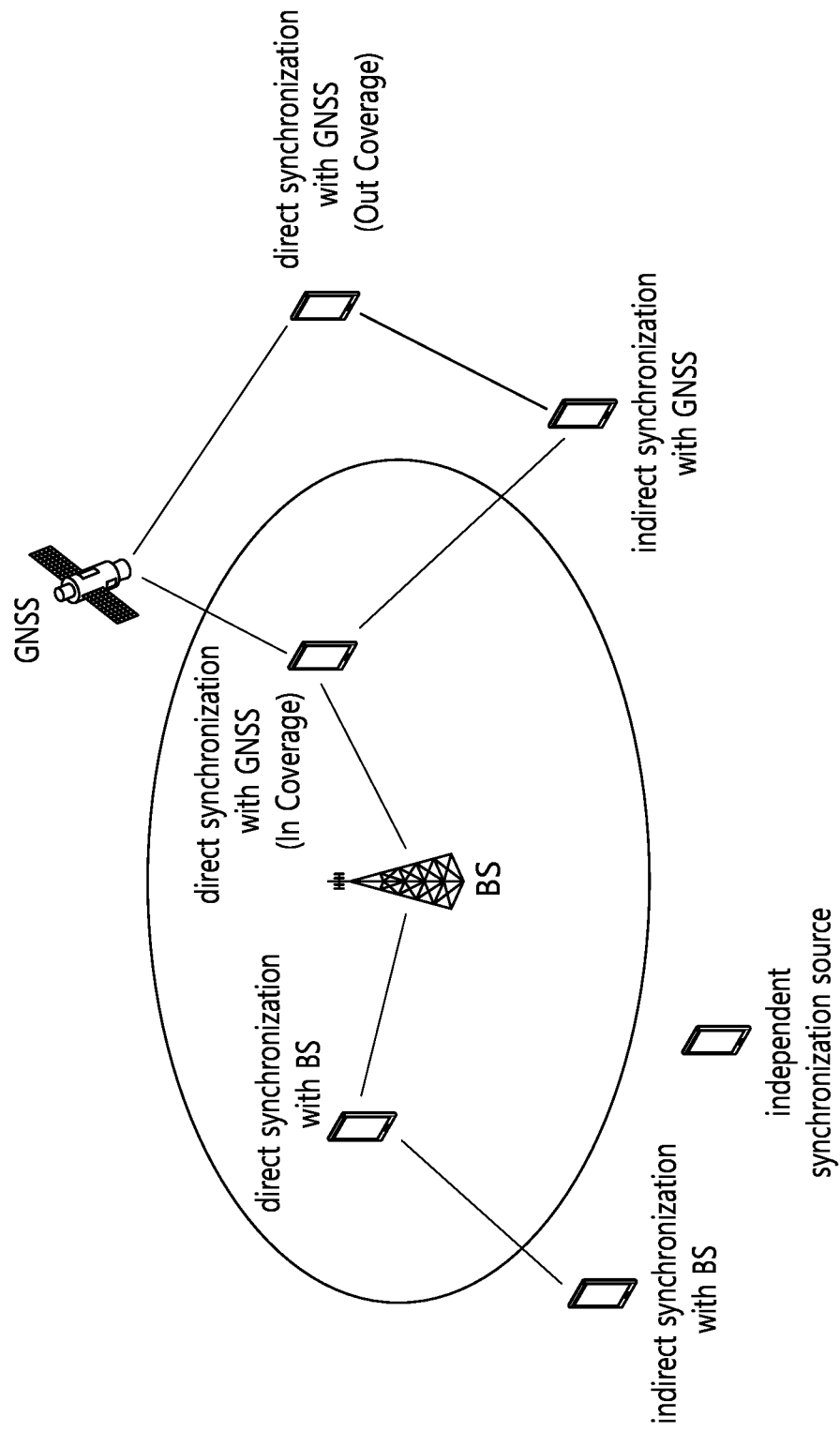
FIG. 15 shows a synchronization source or synchronization reference of V2X to which an exemplary embodiment of the present disclosure can be applied.

FIG. 15 shows a synchronization source or synchronization reference of V2X to which an exemplary embodiment of the present disclosure can be applied.

Referring to FIG. 15, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 3. Table 3 is for exemplary purposes only, and the relation between the synchronization source and the synchronization priority may be defined in various forms.

TABLE 3

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A with GNSS | All UEs directly synchronized |
| P5 | N/A with GNSS | All UEs indirectly synchronized |
| P6 | N/A | All other UEs |

Whether to use GNSS-based synchronization or BS-based synchronization may be (pre-)configured. In a single-carrier operation, the UE may derive transmission timing of the UE from an available synchronization reference having the highest priority.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 16:
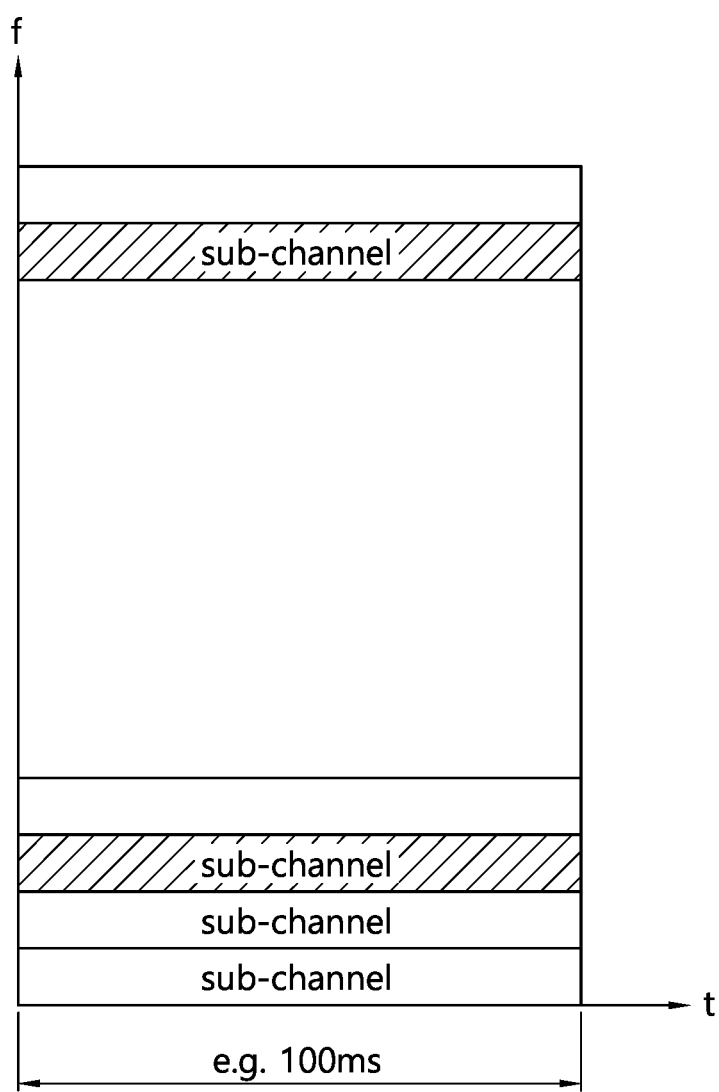
FIG. 16 shows a CBR to which an exemplary embodiment of the present disclosure can be applied.

FIG. 16 shows a CBR to which an exemplary embodiment of the present disclosure can be applied.

Referring to FIG. 16, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 16, if it is assumed that a hatched sub-channel is a sub-channel having a value greater than or equal to a pre-configured threshold, the CBR may denote a ratio of the hatched sub-channels for a period of 100 ms.

Further, congestion control considering a priority of traffic (e.g., packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, a bandwidth part (BWP) and a carrier will be described.

The BWP may be a consecutive set of physical resource blocks (PRBs) in a given numerology. The PRB may be selected from a consecutive subset of common resource blocks (CRBs) for a given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive a PDCCH, a PDSCH, or a CSI-RS (however, an RRM is excluded) outside the active DL BWP. For example, the UE may not trigger a CSI report for an inactive DL BWP. For example, the UE may not transmit a PUCCH or a PUSCH outside the active UL BWP. For example, in a downlink case, the initial BWP may be given as a consecutive RB set for an RMSI CORESET (configured by a PBCH). For example, in an uplink case, the initial BWP may be given by an SIB for a random access procedure. For example, the default BWP may be configured by a higher layer. For example, an initial value of the default BWP may be an initial DL BWP. For energy saving, if the UE cannot detect DCI for a specific period of time, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 17:
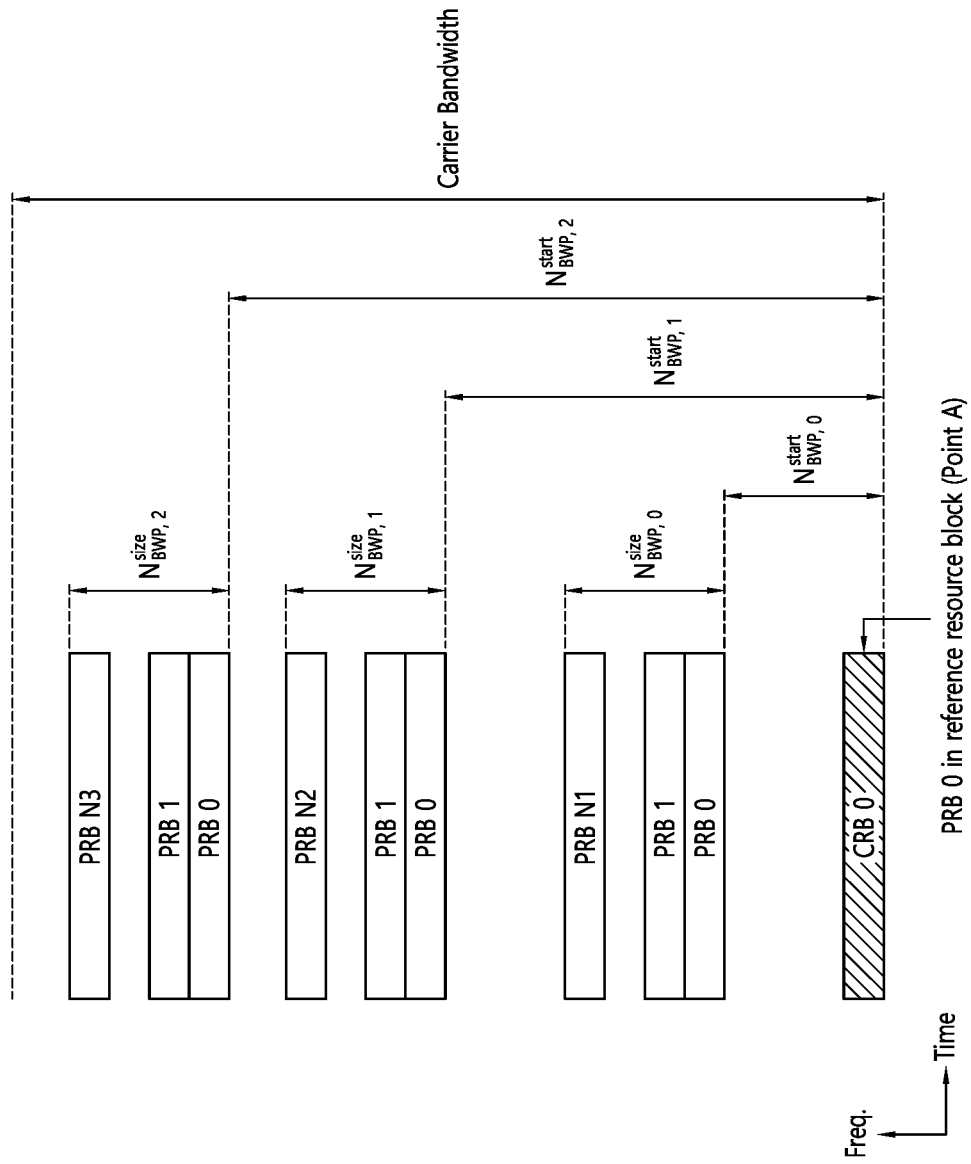
FIG. 17 shows a BWP to which an exemplary embodiment of the present disclosure can be applied.

FIG. 17 shows a BWP to which an exemplary embodiment of the present disclosure can be applied. It is assumed in the embodiment of FIG. 17 that the number of BWPs is 3.

Referring to FIG. 17, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Meanwhile, when a UE supporting LTE V2X (re)selects a carrier being used for transmitting a packet related to a specific PPPP, the UE may use a CBR value that is measured per carrier. In this case, there may be one pool from which a CBR value is measured and/or derived per carrier. A method for (re)selecting, by the UE, a carrier based on the CBR value may be as described below.

Only a carrier having a CBR value that does not exceed a first CBR threshold value (hereinafter, RES_CBRTH) related to a preconfigured specific PPPP may be included in a (re)selectable candidate carrier set.

Finally, the UE may (re)select a carrier having a lowest CBR value from the (re)selectable candidate carrier set.

When carrier reselection is triggered, even if there exists another carrier having a CBR value that does not exceed RES_CBRTH while being lower than the current carrier, if the CBR value of the current carrier does not exceed a second CBR threshold value (e.g., a type of hysteresis margin) related to an additionally configured specific PPPP, the UE may maintain the current carrier. In this specification, for convenience in the description, the second CBR threshold value may be referred to as HYS_CBRTH. HYS_CBRTH is a threshold value for preventing the UE from frequently switching carriers, and system stability may be ensured through HYS_CBRTH. Additionally, carrier reselection may be triggered and/or allowed only when a resource reselection operation is performed on a current (or existing) carrier.

Meanwhile, as described above, BWP is introduced in NR sidelink or NR V2X. For example, in case of NR, multiple services may be mapped within the carrier, and (partly) different services per BWP may be mapped. Additionally, for example, for a BWP to which a service having different requirements is mapped, different numerologies (e.g., subcarrier spacing, TTI, and so on) may be configured. In this specification, it will be assumed that the UE, at least, has an RF capability that can simultaneously monitor BWPs having a service of interest mapped thereto and/or an RF capability that can simultaneously receive a service of interest through BWPs having the service of interest mapped thereto. For example, the UE may, at least, have an RF capability that can simultaneously monitor BWPs having a service of interest mapped thereto within a carrier and/or an RF capability that can simultaneously receive a service of interest through BWPs having the service of interest mapped thereto within a carrier.

However, in case multiple services are mapped to multiple BWPs being included in multiple carriers, the UE may need a method for (re)selecting a carrier and/or BWP that is to be used for a specific service among the multiple services.

For example, it will be assumed that two carriers (e.g., Carrier #A and Carrier #B) exist and that a mapping relationship of the services per BWP included in each carrier is as shown below in Table 4.

TABLE 4

| Carrier | BWP | Service |
|---|---|---|
| Carrier #A | BWP #A-1 | Service #X |
|  | BWP #A-2 | Service #X |
|  |  | Service #Y |
|  | BWP #A-3 | Service #Z |
| Carrier #B | BWP #B-1 | Service #X |
|  | BWP #B-2 | Service #Z |

Referring to Table 4, in case of Carrier #A, which is configured to have 3 BWPs, Service #X may be mapped to BWP #A-1, Service #X and Service #Y may be mapped to BWP #A-2, and Service #Z may be mapped to BWP #A-3. That is, Service #X, Service #Y, and Service #Z may be mapped to Carrier #A. Additionally, in case of Carrier #B, which is configured to have 2 BWPs, Service #X may be mapped to BWP #B-1, and Service #Z may be mapped to BWP #B-2.

In the embodiment of Table 4, for example, in case of Carrier #A, the number of BWPs being mapped to Service #X may be equal to 2. In case of Carrier #A, the BWPs being mapped to Service #X may be BWP #A-1 and BWP #A-2. In this case, how to determine or derive, by the UE, a CBR value related to Carrier #A may be an issue (or problem).

Therefore, according the embodiment of the present disclosure, a method for determining a CBR for a carrier including multiple BWPs and an apparatus (or device) supporting the same will hereinafter be described in detail.

In the present specification, sidelink RSSI (S-RSSI) may be defined as the linear average of the total received power (in [W]) per SC-FDMA symbol observed by the UE only in the configured sub-channel in SC-FDMA symbols 1, 2, ..., 6 of the first slot and SC-FDMA symbols 0, 1, ..., 5 of the second slot of a subframe. In the present specification, PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH).

In the present specification, a receiving operation of the UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or WAN DL signal (e.g., PDCCH, PDSCH, PSS/SSS, etc.). The receiving operation of the UE may include a sensing operation and/or a CBR measuring operation. In the present specification, the sensing operation of the UE may include a PSSCH-RSRP measuring operation based on a PSSCH DM-RS sequence, a PSSCH-RSRP measuring operation based on a PSSCH DM-RS sequence scheduled by a PSCCH successfully decoded by the UE, a sidelink RSSI (S-RSSI) measuring operation, and/or an S-RSSI measuring operation based on a sub-channel related to a V2X resource pool. In the present specification, a transmitting operation of the UE may include a transmitting operation of a sidelink channel and/or a sidelink signal (e.g., PSCCH, PSSCH, PSFCH, PSBCH, PSSS/SSSS, etc.). The transmitting operation of the UE may include a transmitting operation of a WAN UL channel and/or a WAN UL signal (e.g., PUSCH, PUCCH, SRS, etc.). In the present specification, a synchronization signal may include an SLSS and/or a PSBCH.

In the present specification, an operation in which the UE performs CBR measurement for the BWP may include an operation in which the UE performs CBR measurement on one or more pools configured in the BWP. The CBR for the BWP may include a CBR measured on the one or more pools configured in the BWP. In the present specification, the BWP may include one or more resource pools.

For example, the UE may perform CBR measurement for one resource pool included in one BWP, and the UE may determine a CBR value measured in the one resource pool as the CBR value of the BWP.

For example, the UE may perform CBR measurement for a plurality of resource pools included in one BWP, and the UE may determine the CBR values of the BWP, based on the CBR values measured in the plurality of resource pools. For example, when the UE performs the CBR measurement for the plurality of resource pools, the UE may consider/determine a maximum value among the CBR measurement values as the CBR values of the BWP. For example, when the UE performs the CBR measurement for the plurality of resource pools, the UE may consider/determine a minimum value among the CBR measurement values as the CBR values of the BWP. For example, when the UE performs the CBR measurement for the plurality of resource pools, the UE may consider/determine an average value of the CBR measurement values or a weight average value as the CBR value of the BWP. For example, when the UE performs the CBR measurement for the plurality of resource pools, the UE may consider/determine a sum of the CBR measurement values as the CBR value of the BWP. For example, when the UE performs the CBR measurement for the plurality of resource pools, the UE may consider/determine a CBR value measured in a pre-configured resource pool as the CBR value of the BWP. For example, when the UE performs the CBR measurement for the plurality of resource pools, the UE may consider/determine a CBR value measured in a pre-configured resource pool related to a lowest index as the CBR value of the BWP. For example, when the UE performs the CBR measurement for the plurality of resource pools, the UE may consider/determine a CBR value measured in a resource pool related to a highest index as the CBR value of the BWP. For example, when the UE performs the CBR measurement for the plurality of resource pools, the UE may consider/determine a CBR value measured in a resource pool having a great CR value (e.g., a resource pool in which CR with a margin against CR_LIMIT is greater than or equal to a pre-configured threshold) as the CBR value of the BWP. For example, when the UE performs the CBR measurement for the plurality of resource pools, the UE may consider/determine a CBR value measured in a resource pool having a small CR value (e.g., a resource pool in which CR with a margin against CR_LIMIT is greater than or equal to a pre-configured threshold) as the CBR value of the BWP.

Some or all of the methods proposed in the present specification may be limited to a transmitting operation of the UE, a transmission carrier selecting operation, and/or a transmission BWP selecting operation. Alternatively, for example, some or all of the methods proposed in the present specification may be limited to a receiving operation of the UE, a reception carrier selecting operation, and/or a reception BWP selecting operation. In the present specification, a configuration may include signaling, signaling from the network, a configuration from the network, and/or a pre-configuration from the network.

In this specification, a service may be a service being related to sidelink. For example, the service may be related to a PPPP value. For example, the PPPP value may be related to a CBR threshold value.

In this specification, a first service may include at least one of a packet related to a first service, a service related to a first PPPP value, a packet related to a first PPPP value, and/or a packet related to a service being related to a first PPPP value. In this specification, a low (or small) PPPP value may be related to a high priority level, and a high (or large) PPPP value may be related to a low priority level.

Figure 18:
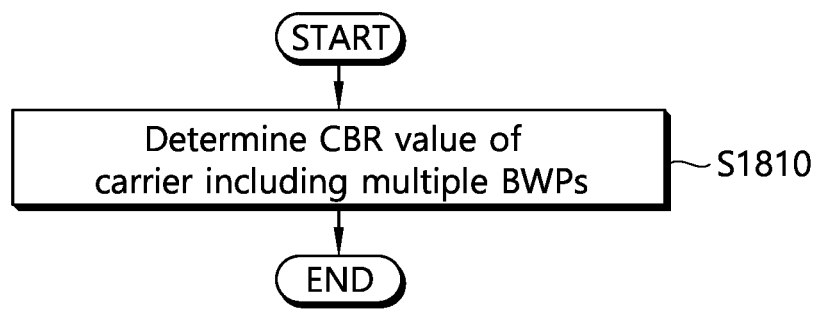
FIG. 18 shows a method for determining, by a user equipment (UE), a CBR value of a carrier including multiple BWPs according to an embodiment of the present disclosure.

FIG. 18 shows a method for determining, by a user equipment (UE), a CBR value of a carrier including multiple BWPs according to an embodiment of the present disclosure.

Referring to FIG. 18, in step S1810, a UE may determine a CBR value of a carrier having multiple BWPs configured therein. In this specification, a CBR value of a carrier may be referred to as a carrier-related CBR value. For example, the UE may select or reselect a carrier that is to be used for service transmission, and, in this case, the UE may use the CBR value. For example, the CBR value may be a representative CBR value of the carrier. For simplicity in the description, the representative CBR value of the carrier may be referred to as REF_CBR. For example, the multiple BWPs may be active BWPs. For example, part of the multiple BWPs may be inactive BWPs, and the remaining multiple BWPs may be active BWPs.

For example, the UE may determine whether or not a REF_CBR value of the carrier exceeds a RES_CBRTH value. For example, the UE may determine whether or not a REF_CBR value of the carrier exceeds a HYS_CBRTH value.

For example, a carrier that may be used by the UE for transmitting a first service or a packet related to a first service may be limited to a first service or a carrier having a first service mapped thereto. Alternatively, for example, a carrier that may be used by the UE for transmitting a service related to a first PPPP value or a packet related to a first PPPP value may be limited to a service related to a first PPPP value or a carrier having a packet related to a first PPPP value mapped thereto.

More specifically, for example, when selecting or reselecting a carrier that is to be used for the transmission of a first service, the UE may derive/determine REF_CBR based on part or all of the rules proposed below.

According to an embodiment of the present disclosure, the UE may perform CBR measurement only on a BWP having a first service mapped thereto within a carrier. Alternatively, the UE may perform CBR measurement on all BWPs regardless of the type of services mapped thereto within the carrier. For example, in case the UE performs CBR measurement on multiple BWPs, the UE may regard/determine a lowest value (or minimum value) among the CBR measurement values as the REF_CBR value. For example, in case the UE performs CBR measurement on multiple BWPs, the UE may regard/determine a highest value (or maximum value) among the CBR measurement values as the REF_CBR value. For example, in case the UE performs CBR measurement on multiple BWPs, the UE may regard/determine an average value or weighted average value of the CBR measurement values as the REF_CBR value. For example, the UE may regard/determine a sum of the CBR measurement values as the REF_CBR value.

For example, a REF_CBR value used for determining whether or not RES_CBRTH is being exceeded and a REF_CBR value used for determining whether or not HYS_CBRTH is being exceeded may be differently derived. For example, the REF_CBR value used for determining whether or not HYS_CBRTH is being exceeded may be defined as a lowest value (or minimum value) among the multiple CBR values measured for multiple BWPs. For example, the REF_CBR value used for determining whether or not RES_CBRTH is being exceeded may be defined as a highest value (or maximum value) among the multiple CBR values measured for multiple BWPs. In this case, for example, the UE may perform carrier reselection only when all of the multiple CBR values measured from multiple BWPs having a first service mapped thereto within the carrier exceed HYS_CBRTH. In other words, if any one CBR value among the multiple CBR values measured from multiple BWPs does not exceed HYS_CBRTH, the UE may not perform carrier reselection. Alternatively, the REF_CBR value used for determining whether or not RES_CBRTH is being exceeded may be defined as the average value or weighted average value of the multiple CBR values measured for multiple BWPs.

According to an embodiment of the present disclosure, within a carrier, a BWP for measuring a REF_CBR related to a first service may be configured or preconfigured for the UE. For example, a BWP for measuring a REF_CBR related to a first service may be configured or preconfigured from a network. For example, a BWP for measuring a REF_CBR related to a first service may be (independently) configured per carrier. For example, a BWP for measuring a REF_CBR related to a first service may be (independently) configured per service. For example, a BWP for measuring a REF_CBR related to a first service may be (independently) configured per carrier and service. For example, a BWP for measuring a REF_CBR related to a first service may be at least one of the BWPs listed below.

BWP having a first service mapped thereto, and/or

BWP through which a preconfigured channel and/or signal (e.g., SLSS/PSBCH) is transmitted, and/or synchronization reference BWP (SYNCH REFERENCE BWP), wherein, for example, the synchronization reference BWP is a BWP having reference made to time and/or frequency synchronization, and/or BWP of preconfigured numerology (e.g., sub-carrier spacing, and so on), and/or BWP having CBR measurement performed thereon during a preconfigured time length, and/or BWP that can be supported with RF capability of UE, and/or BWP having no preconfigured other RAT (e.g., Dedicated Short Range Communication (DSRC)) detected therefrom, and/or BWP having first service configured at a highest priority level, and/or BWP having a high CR value, e.g., BWP wherein the remaining CR against CR_LIMIT is equal to or greater than a preconfigured threshold value, and/or BWP having a low CR value, e.g., BWP wherein the remaining CR against CR_LIMIT is less than or equal to a preconfigured threshold value.

According to an embodiment of the present disclosure, among BWPs having a first service mapped thereto within a carrier, the UE may perform CBR measurement on a BWP satisfying part or all of the following conditions. And, the UE may determine/derive a REF_CBR value of the carrier based on the measured CBR value. For example, in case there are multiple BWPs satisfying part or all of the following conditions, the UE may regard/determine a lowest value (or minimum value) of the CBR measurement values as the REF_CBR value. For example, in case there are multiple BWPs satisfying part or all of the following conditions, the UE may regard/determine a highest value (or maximum value) of the CBR measurement values as the REF_CBR value. For example, in case there are multiple BWPs satisfying part or all of the following conditions, the UE may regard/determine an average value or weighted average value of the CBR measurement values as the REF_CBR value. For example, in case there are multiple BWPs satisfying part or all of the following conditions, the UE may regard/determine a sum of the CBR measurement values as the REF_CBR value.

BWP related to a lowest index, and/or

BWP related to a highest index, and/or randomly selected BWP, and/or

BWP having CBR measurement performed thereon during a preconfigured time length, and/or BWP that can be supported with RF capability of UE, and/or BWP having no preconfigured other RAT (e.g., DSRC) detected therefrom, and/or BWP having first service configured at a highest priority level, and/or BWP having a high CR value, e.g., BWP wherein the remaining CR against CR_LIMIT is equal to or greater than a preconfigured threshold value, and/or BWP having a low CR value, e.g., BWP wherein the remaining CR against CR_LIMIT is less than or equal to a preconfigured threshold value, and/or BWP through which a preconfigured channel and/or signal (e.g., SLSS/PSBCH) is transmitted, and/or synchronization reference BWP (SYNCH REFERENCE BWP), wherein, for example, the synchronization reference BWP is a BWP having reference made to time and/or frequency synchronization, and/or BWP of preconfigured numerology (e.g., sub-carrier spacing, and so on).

According to the embodiment of the present disclosure, the UE may efficiently determine the CBR of a carrier including multiple BWPs.

Figure 19:
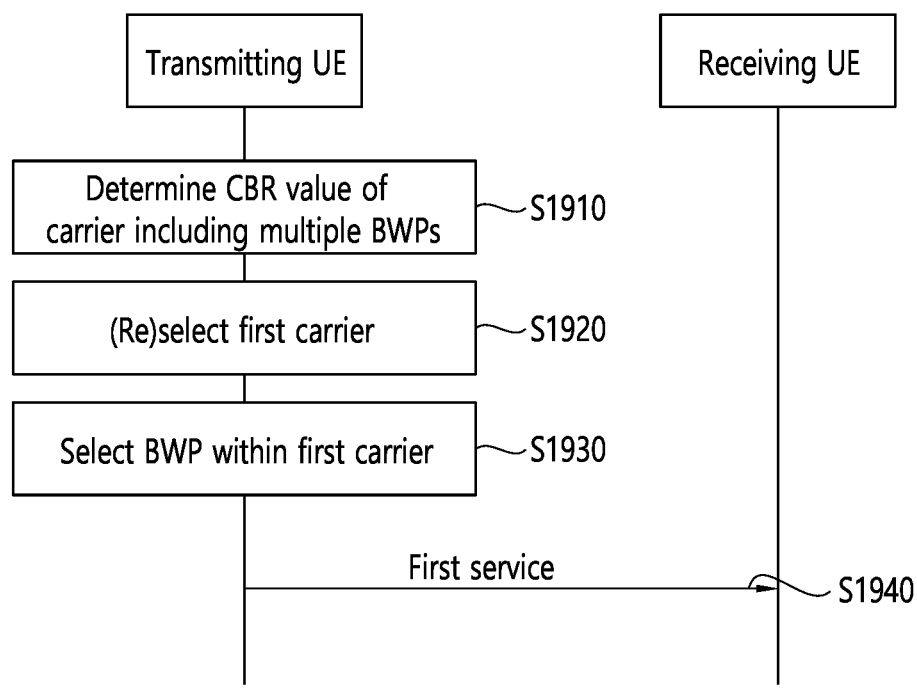
FIG. 19 shows a method for transmitting, by a user equipment (UE), a sidelink service through one or more BWPs according to an embodiment of the present disclosure.

FIG. 19 shows a method for transmitting, by a user equipment (UE), a sidelink service through one or more BWPs according to an embodiment of the present disclosure.

Referring to FIG. 19, in step S1910, the UE may determine a REF_CBR of a carrier having multiple BWPs configured thereto. According to the various methods proposed in step S1810 of FIG. 18, the UE may determine a REF_CBR that is related to a carrier having multiple BWPs configured thereto.

In the embodiment of FIG. 19, it is assumed that the UE determines a REF_CBR of a first carrier having one or more BWPs configured thereto and a REF_CBR of a second carrier having one or more BWPs configured thereto.

In step S1920, the UE may select or reselect a carrier based on REF_CBR.

For example, in case of carrier selection, based on the REF_CBR of the first carrier and the REF_CBR of the second carrier, the UE may select at least one carrier from the first carrier and the second carrier. For example, if the REF_CBR of the first carrier is lower (or smaller) than the REF_CBR of the second carrier, the UE may select the first carrier.

For example, in case of carrier reselection, based on the REF_CBR of the first carrier and the REF_CBR of the second carrier, the UE may reselect at least one carrier from the first carrier and the second carrier. For example, if the REF_CBR of the first carrier is lower (or smaller) than the REF_CBR of the second carrier, and if the REF_CBR of the current carrier of the UE exceeds HYS_CBRTH, the UE may reselect the first carrier.

In the embodiment of FIG. 19, it is assumed that the UE selects or reselects a first carrier.

In step S1930, the UE may select at least one or more BWPs within the first carrier having multiple BWPs configured thereto. For example, the UE may select one BWP within the first carrier having multiple BWPs configured thereto. For example, in case there exist multiple BWPs having the first service mapped thereto, within the first carrier that is selected or reselected based on the REF_CBR, the UE may finally select a BWP, according to part or all of the rules that will hereinafter be proposed. The finally selected BWP may be at least one of the BWPs listed below.

BWP having a lowest CBR value, among BWPs not exceeding REF_CBR of first carrier, and/or BWP having a highest CBR value, among BWPs not exceeding REF_CBR of first carrier, and/or randomly selected BWP, among BWPs not exceeding REF_CBR of first carrier, and/or BWP having a lowest CBR value, among BWPs not exceeding preconfigured threshold value, and/or BWP having a highest CBR value, among BWPs not exceeding preconfigured threshold value, and/or randomly selected BWP, among BWPs not exceeding preconfigured threshold value, and/or BWP having a lowest CBR value, among BWPs having first service mapped thereto, and/or BWP having a highest CBR value, among BWPs having first service mapped thereto, and/or randomly selected BWP, among BWPs having first service mapped thereto, and/or BWP related to a lowest index, among BWPs having first service mapped thereto, and/or BWP related to a highest index, among BWPs having first service mapped thereto, and/or BWP having CBR measurement performed thereon during a preconfigured time length, among BWPs having first service mapped thereto, and/or BWP wherein the remaining CR against CR_LIMIT is the highest, among BWPs having first service mapped thereto, and/or BWP wherein the remaining CR against CR_LIMIT is the lowest, among BWPs having first service mapped thereto, and/or BWP having first service configured at a highest priority level, among BWPs having first service mapped thereto, and/or BWP through which a preconfigured channel/signal (e.g., SLSS/PSBCH) is transmitted, among BWPs having first service mapped thereto, and/or synchronization reference BWP, among BWPs having first service mapped thereto, and/or BWP of preconfigured numerology (e.g., sub-carrier spacing, and so on), among BWPs having first service mapped thereto, and/or BWP having no preconfigured other RAT (e.g., DSRC) detected therefrom, among BWPs having first service mapped thereto, and/or BWP that can be supported with RF capability of UE, among BWPs having first service mapped thereto.

In step S1940, the UE may transmit a first service through the selected BWP. For example, the UE may transmit a first service to a receiving UE through the selected BWP.

For example, in case the UE selects a BWP having a low (or small) CBR value, the UE may efficiently transmit the first service in a non-congested channel environment. For example, in case of a service related to high reliability or high priority, it may be advantageous for the UE to transmit the service through a BWP having a low (or small) CBR value.

For example, in case the UE selects a BWP having a high (or large) CBR value, the UE may simultaneously transmit the first service to multiple UEs. For example, in case of a service that needs to be transmitted to multiple UEs, such as a basic safety message, it may be advantageous for the UE to transmit the service through a BWP having a high (or large) CBR value. For example, since the likelihood of multiple UEs existing on a BWP having a high CBR is high, in case the UE transmits the service through a BWP having a high CBR value, the likelihood of the UE providing the service to multiple UEs may become high.

According to the embodiment of the present disclosure, operations of reselecting or switching a BWP or carrier, by the UE, may be authorized only when a resource reselection operation is triggered on the current (or existing) BWP. Herein, for example, the rule may be limitedly applied only in the case where the UE reselects or switches the BWP within the carrier. For example, the resource reselection operation on the BWP of the UE may be triggered even in a case where at least one of BWP size, BWP location, and/or number of active BWPs is reconfigured.

According to the embodiment of the present disclosure, a RES_CBRTH and/or HYS_CBRTH that is used by the UE for determining whether or not carrier switching can be performed between multiple carriers may be configured differently or independently from a RES_CBRTH and/or HYS_CBRTH that is used by the UE for determining whether or not BWP switching can be performed between multiple BWPs within a same carrier. Alternatively, for example, a RES_CBRTH and/or HYS_CBRTH that is used by the UE for determining whether or not BWP switching can be performed between multiple carriers may be configured differently or independently from a RES_CBRTH and/or HYS_CBRTH that is used by the UE for determining whether or not BWP switching can be performed between BWPs within a same carrier.

According to the embodiment of the present disclosure, the UE may (independently) perform CBR measurement in BWP units. Additionally/alternatively, the UE may (independently) perform CBR-based PHY parameter adaptation (e.g., this may be interpreted as a type of a load control operation). Additionally/alternatively, the UE may (independently) perform CR measurement in BWP units. Additionally/alternatively, the UE may (independently) perform sensing in BWP units. Additionally/alternatively, the UE may (independently) perform resource reservation in BWP units. For example, PHY parameter adaptation may include at least one of a maximum transmission power (including zero power transmission), a range of number of retransmissions per TB, a range of PSSCH resource blocks, a range of MCS, and/or a maximum limit on occupancy ratio (CR_LIMIT). For example, a time length related to the CBR measurement, CR measurement, and/or sensing performed by the UE on the BWP may be independently or differently configured per service type, service priority, and/or numerology.

According to the embodiment of the present disclosure, the UE may perform one CBR measurement throughout multiple BWPs. Additionally/alternatively, the UE may perform CBR-based PHY parameter adaptation throughout multiple BWPs. Additionally/alternatively, the UE may perform one CR measurement throughout multiple BWPs. Additionally/alternatively, the UE may perform sensing throughout multiple BWPs. Additionally/alternatively, the UE may perform resource reservation throughout multiple BWPs. Herein, for example, the multiple BWPs may be (part of) preconfigured BWPs among all BWPs. Alternatively, for example, the multiple BWPs may be (part of) preconfigured BWPs among all BWPs within a carrier.

According to the embodiment of the present disclosure, the UE may report information on its RF capability (i.e., the RF capability of the UE) to a network or base station, through a predefined signal. For example, the UE may report, to the network or base station, at least one of a number of BWPs that can be transmitted simultaneously, a number of BWPs that can be received simultaneously, a size of a supportable BWP, and/or a location of a supportable BWP.

According to the embodiment of the present disclosure, in order to mitigate (or alleviate) a gap from being generated due to BWP change or switching, BWPs having a specific service mapped thereto (e.g., active BWPs) may be limited to one BWP or a preconfigured number of BWPs per carrier. For example, BWPs having a specific service mapped thereto (e.g., active BWPs) may be limited to one BWP or a preconfigured number of BWPs per carrier at a random time point. Herein, for example, the preconfigured number may be differently or independently configured in accordance with the service type, service priority, and/or UE type. Herein, for example, the above-described limitation (i.e., the limitation to a preconfigured number) may only be applied to a transmitting BWP. Alternatively, for example, the above-described limitation (i.e., the limitation to a preconfigured number) may only be applied to a transmitting BWP and/or a receiving BWP.

According to the embodiment of the present disclosure, a basic BWP for V2X communication may be independently or differently configured from a BWP for WAN communication. For example, the basic BWP may be an initial BWP and/or a default BWP. Alternatively, for example, a timer value for switching from an active BWP to the basic BWP may be independently or differently configured between V2X communication and WAN communication.

Figure 20:
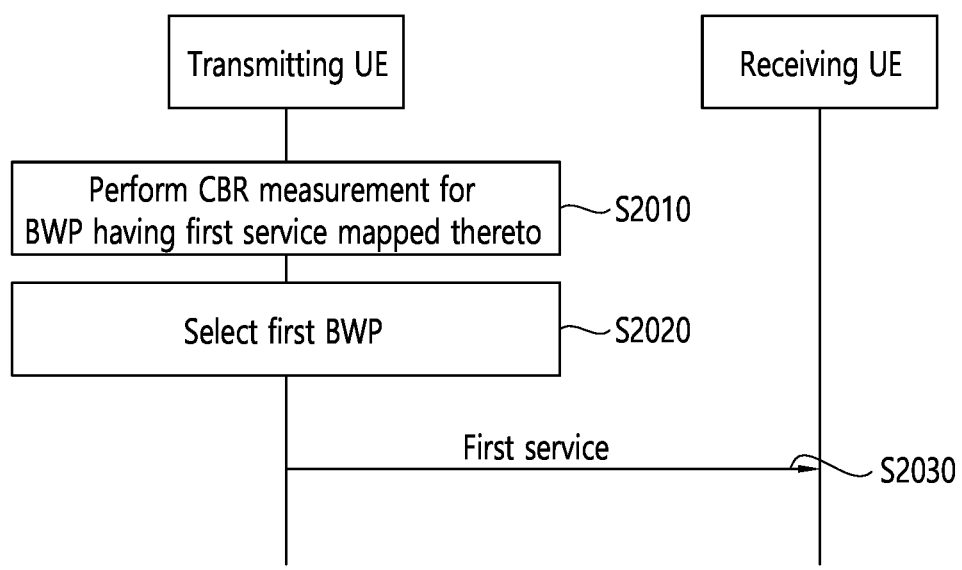
FIG. 20 shows a method for transmitting, by a user equipment (UE), a sidelink service through one or more BWPs according to an embodiment of the present disclosure.

FIG. 20 shows a method for transmitting, by a user equipment (UE), a sidelink service through one or more BWPs according to an embodiment of the present disclosure.

Referring to FIG. 20, in step S2010, the UE may perform CBR measurement for one or more BWPs having a first service mapped thereto. For example, the UE may perform CBR measurement for one or more BWPs having a first service mapped thereto without carrier differentiation. For example, the one or more BWPs having a first service mapped thereto may exist on multiple carriers.

In step S2020, based on the measured CBR value, the UE may select a BWP among the one or more BWPs. For example, among the one or more BWPs having the first service mapped thereto, one or more BWPs having a CBR value that does not exceed RES_CBRTH being related to the first service (e.g., RES_CBRTH being related to a PPPP related to the first service) may be included in a (re)selectable candidate BWP set. Additionally, if a CBR value related to the current BWP of the UE exceeds HYS_CBRTH, the UE may (re)select a BWP having a lowest CBR value among the one or more BWPs being included in the (re)selectable candidate BWP set. In the embodiment of FIG. 20, a BWP having a lowest CBR value may be referred to as a first BWP. Therefore, the UE may select a first BWP among the one or more BWPs, based on the measured CBR values.

In step S2030, the UE may transmit the first service through the first BWP. For example, the UE may transmit the first service to a receiving UE through the first BWP.

According to the embodiment of the present disclosure, the UE may perform BWP-unit switching and not (the current or existing) carrier-unit switching.

Figure 21:
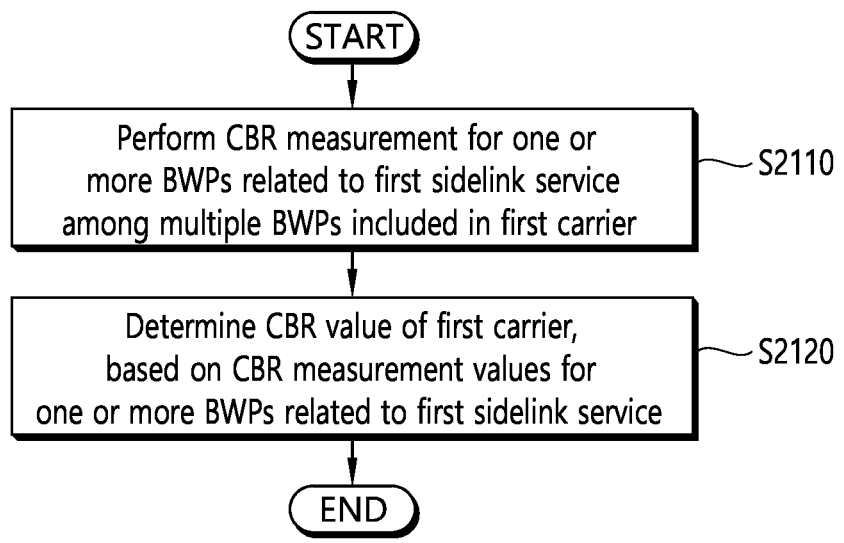
FIG. 21 shows a method for performing sidelink transmission, by a first device (100), according to an embodiment of the present disclosure.

FIG. 21 shows a method for performing sidelink transmission, by a first device (100), according to an embodiment of the present disclosure.

Referring to FIG. 21, in step S2110, the first device (100) may perform channel busy ratio (CBR) measurement for one or more bandwidth parts (BWPs) being related to a first sidelink service, among multiple BWPs included in a first carrier. For example, according to the various methods proposed in this specification, a BWP being an object of CBR measurement may be selected or determined.

For example, the CBR measurement may be performed for one or more BWPs being configured by a base station, among the one or more BWPs. For example, the CBR measurement may be performed for one or more BWPs being configured to have a highest priority level for the first sidelink service, among the one or more BWPs. For example, the CBR measurement may be performed for one or more BWPs being related to a specific numerology, among the one or more BWPs. For example, the CBR measurement may be performed for one or more BWPs through which a preconfigured channel or a preconfigured signal is transmitted, among the one or more BWPs. For example, the CBR measurement may be performed for a synchronization reference BWP, among the one or more BWPs. For example, the CBR measurement may be performed for one or more BWPs having no preconfigured radio access technology (RAT) detected therefrom, among the one or more BWPs. For example, the CBR measurement may be performed for one or more BWPs being selected based on a channel occupancy ratio (CR) value, among the one or more BWPs.

The step of performing CBR measurement for a BWP may be included in a step of performing CBR measurement for one or more resource pools being included in the BWP.

In step S2120, the first device (100) may determine a CBR value of the first carrier, based on the CBR measurement values for the one or more BWPs being related to the first sidelink service. For example, according to the various methods proposed in this specification, the first device (100) may determine a CBR value of the first carrier.

For example, among the CBR measurement values for the one or more BWPs, a minimum value may be determined as the CBR value of the first carrier. For example, among the CBR measurement values for the one or more BWPs, a maximum value may be determined as the CBR value of the first carrier.

Additionally, among multiple BWPs included in a second carrier, the first device (100) may perform CBR measurement for one or more BWPs related to the first sidelink service. And, based on the CBR measurement values for the one or more BWPs related to the first sidelink service among the multiple BWPs included in the second carrier, the first device (100) may determine a CBR value of the second carrier. And, based on the CBR value of the first carrier and the CBR value of the second carrier, the first device (100) may select the first carrier. In this case, the CBR value of the first carrier and the CBR value of the second carrier are equal to or less than a CBR threshold value related to the first sidelink service, and the CBR value of the first carrier may be smaller than the CBR value of the second carrier.

Additionally, among the one or more BWPs related to the first sidelink service included in the first carrier, the first device (100) may transmit the first sidelink service to a second device (200) through a BWP having a smallest CBR value.

Additionally, among the one or more BWPs related to the first sidelink service included in the first carrier, the first device (100) may transmit the first sidelink service to a second device (200) through a BWP having a lowest index.

The proposed method may be performed by various devices proposed in this specification. Firstly, a processor (102) of a first device (100) may perform channel busy ratio (CBR) measurement for one or more bandwidth parts (BWPs) related to a first sidelink service, among one or more BWPs included in a first carrier. And, the processor (102) of the first device (100) may determine a CBR value of the first carrier, based on CBR measurement values for one or more BWPs related to the first sidelink service.

Since the foregoing examples of the proposed method may also be included as implementation methods of the present disclosure, it will be apparent that the examples of the proposed method can be viewed as proposed methods. These proposed methods may be independently implemented, and some thereof may be implemented in a combined (or merged) form. For example, although the proposed method has been described based on a 3GPP system in the present disclosure for simplicity, the scope of systems to which the proposed method can be applied may be extended to other systems apart from the 3GPP LTE system.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
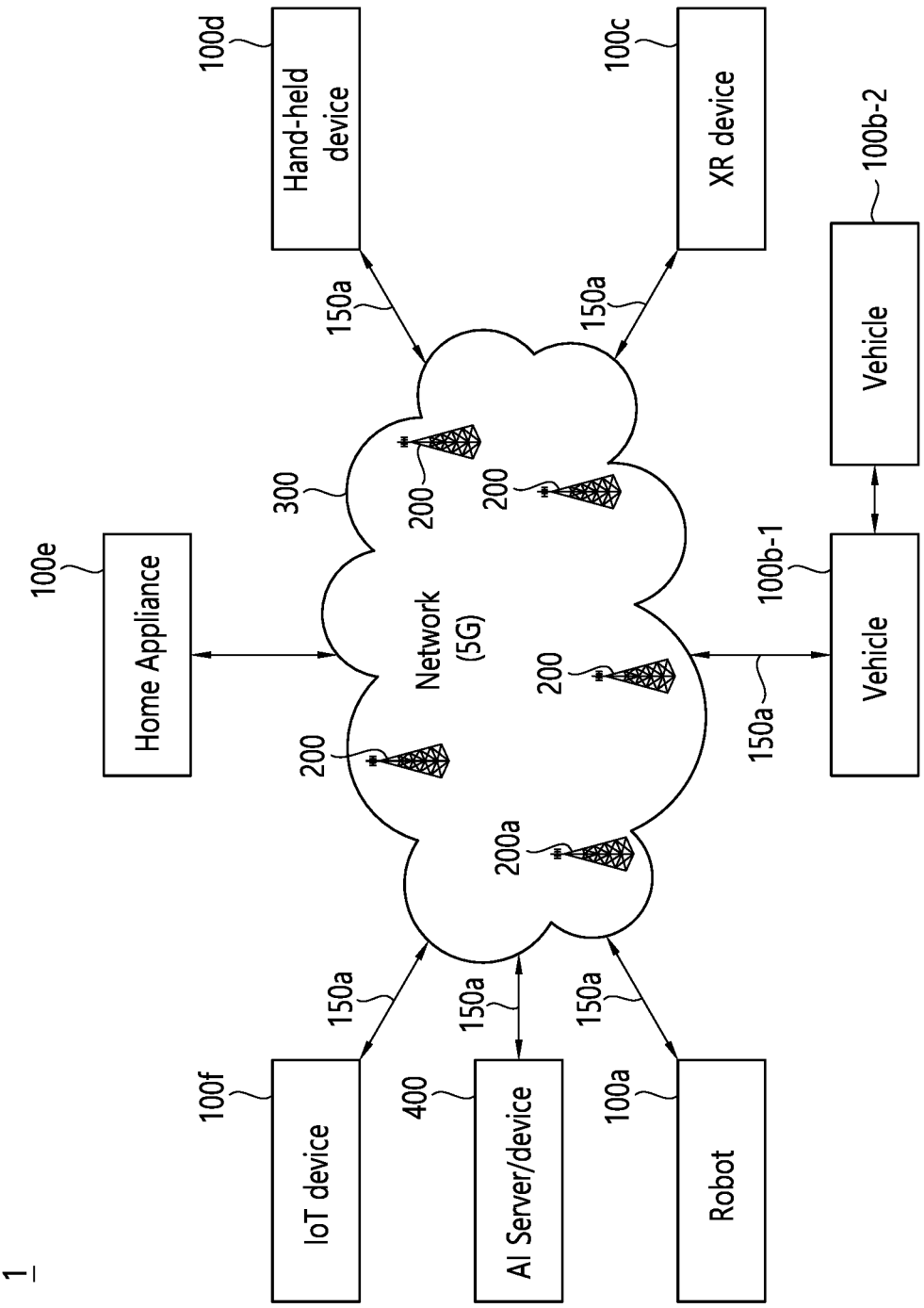
FIG. 22 shows a communication system (1) applied to the present disclosure.

FIG. 22 shows a communication system 1 applied to the present disclosure.

Referring to FIG. 22, a communication system 1 applied to the present disclosure includes wireless devices, base stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
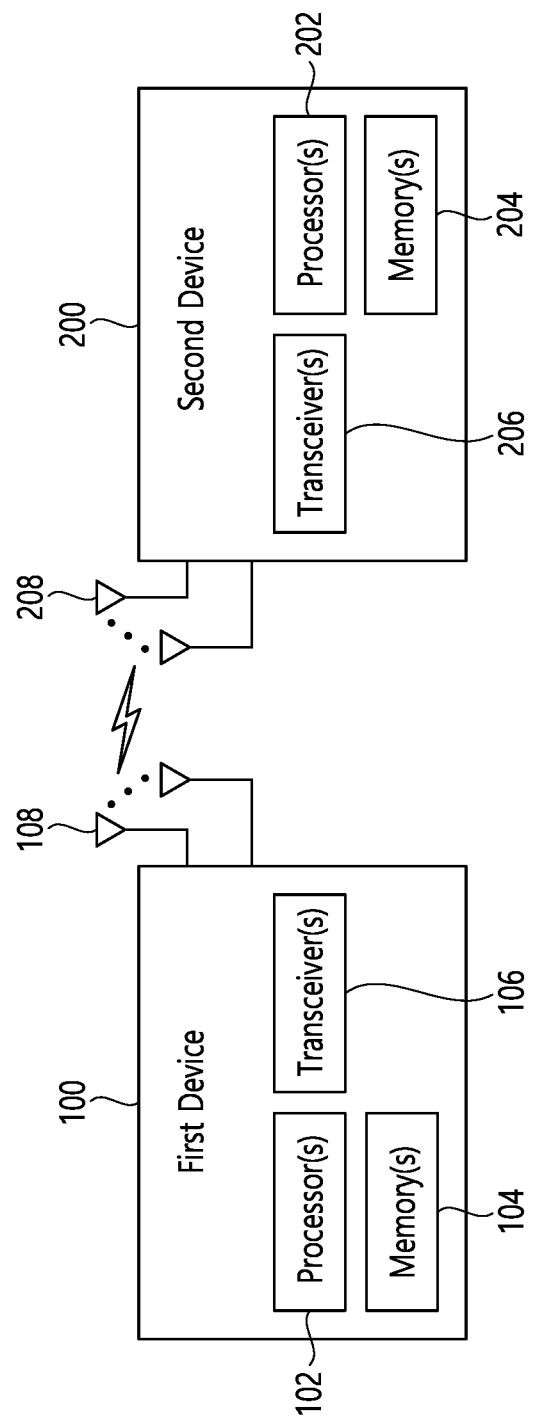
FIG. 23 shows wireless devices applicable to the present disclosure.

FIG. 23 shows wireless devices applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
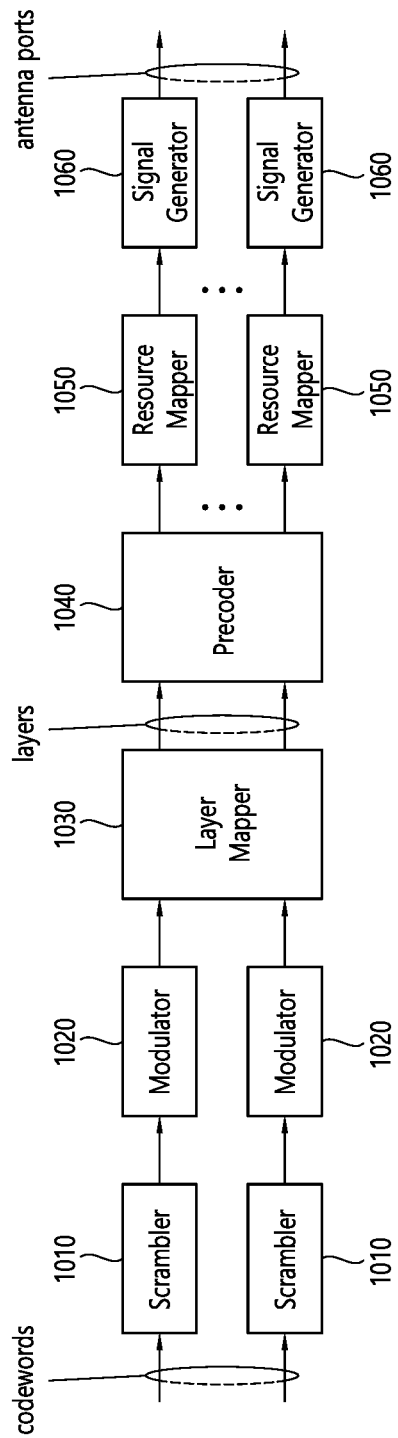
FIG. 24 shows a signal process circuit for a transmission signal.

FIG. 24 shows a signal process circuit for a transmission signal.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
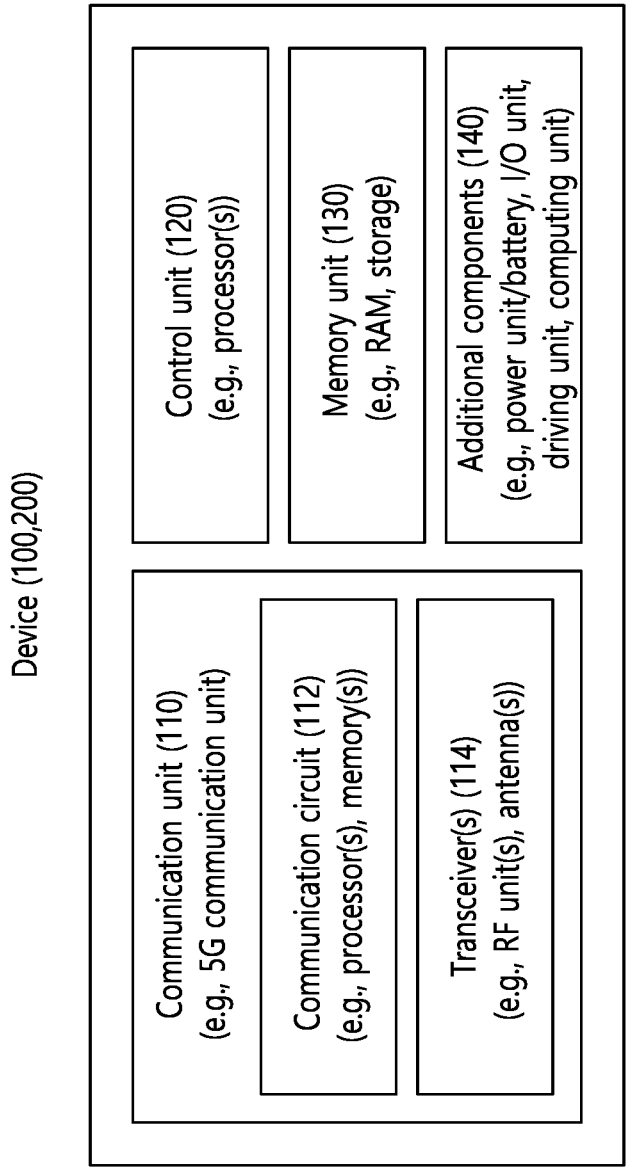
FIG. 25 shows another example of a wireless device applied to the present disclosure.

FIG. 25 shows another example of a wireless device applied to the present disclosure. The wireless device may be implemented in various forms according to a use-case/service (refer to FIG. 22 and FIGS. 26 to 31).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcasting terminal, a hologram device, a public safety device, an MTC device, a medical device, a fintech device (or a finance device), a security device, a climate/environmental device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
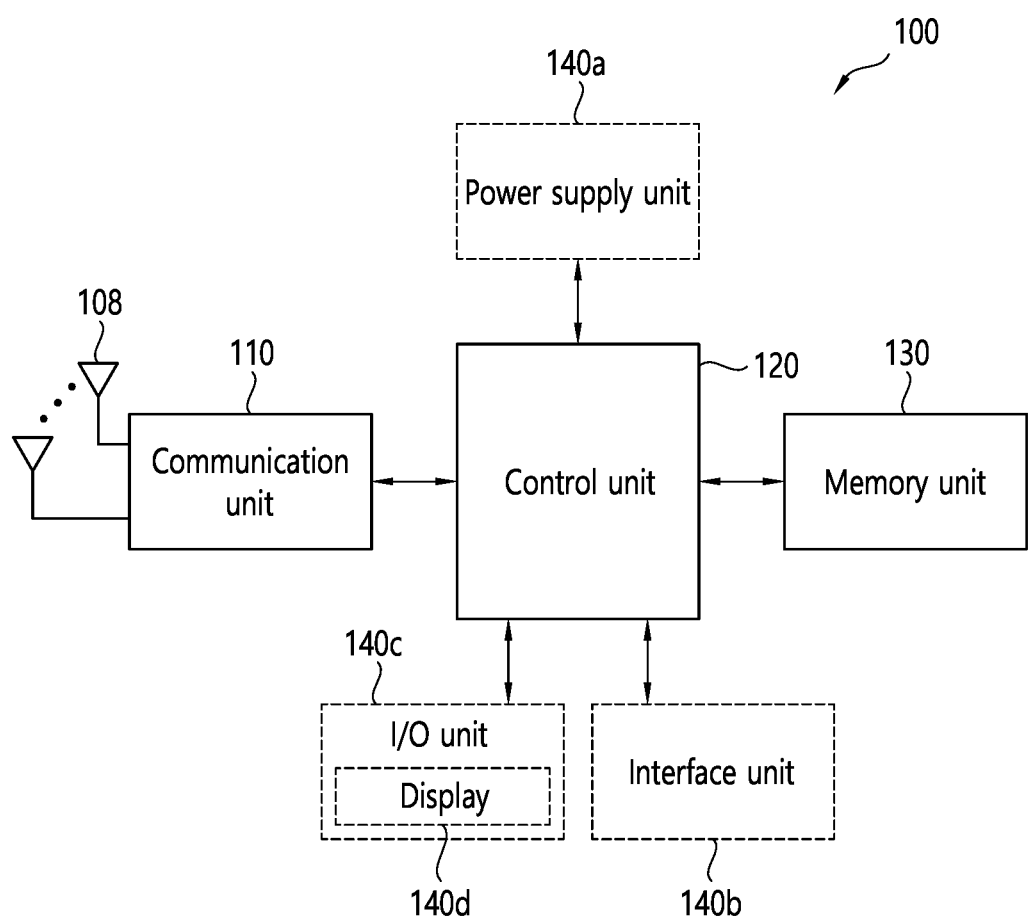
FIG. 26 shows a hand-held device applied to the present disclosure.

FIG. 26 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
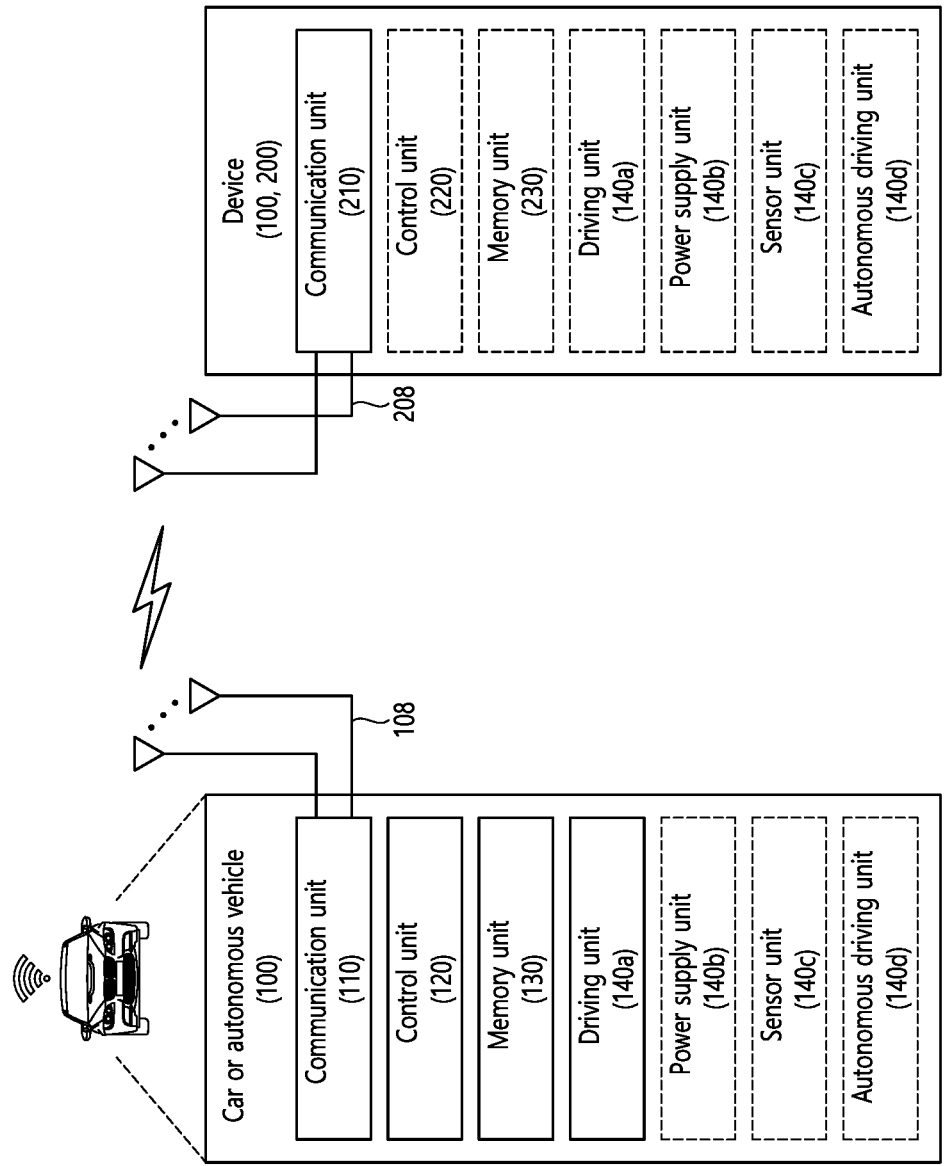
FIG. 27 shows a vehicle or an autonomous driving vehicle applied to the present disclosure.

FIG. 27 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 28:
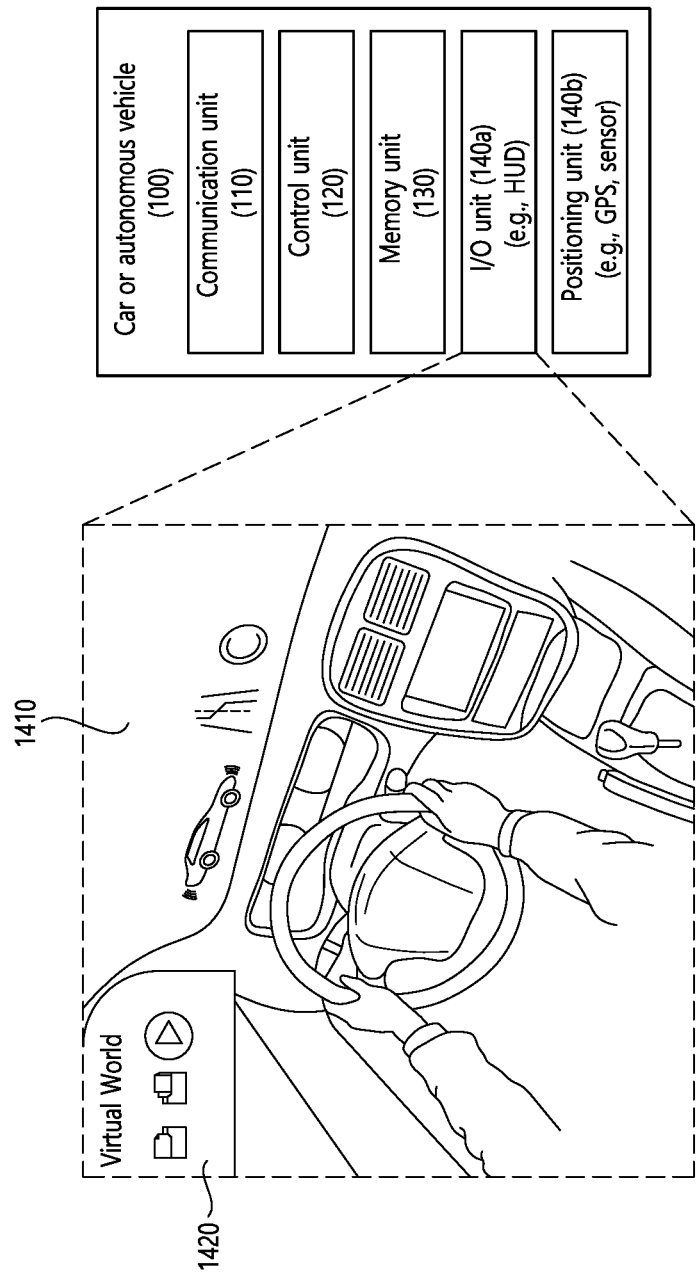
FIG. 28 shows a vehicle applied to the present disclosure.

FIG. 28 shows a vehicle applied to the present disclosure. The vehicle may be implemented as a transport means, an aerial vehicle, a ship, etc.

Referring to FIG. 28, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 25.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Figure 29:
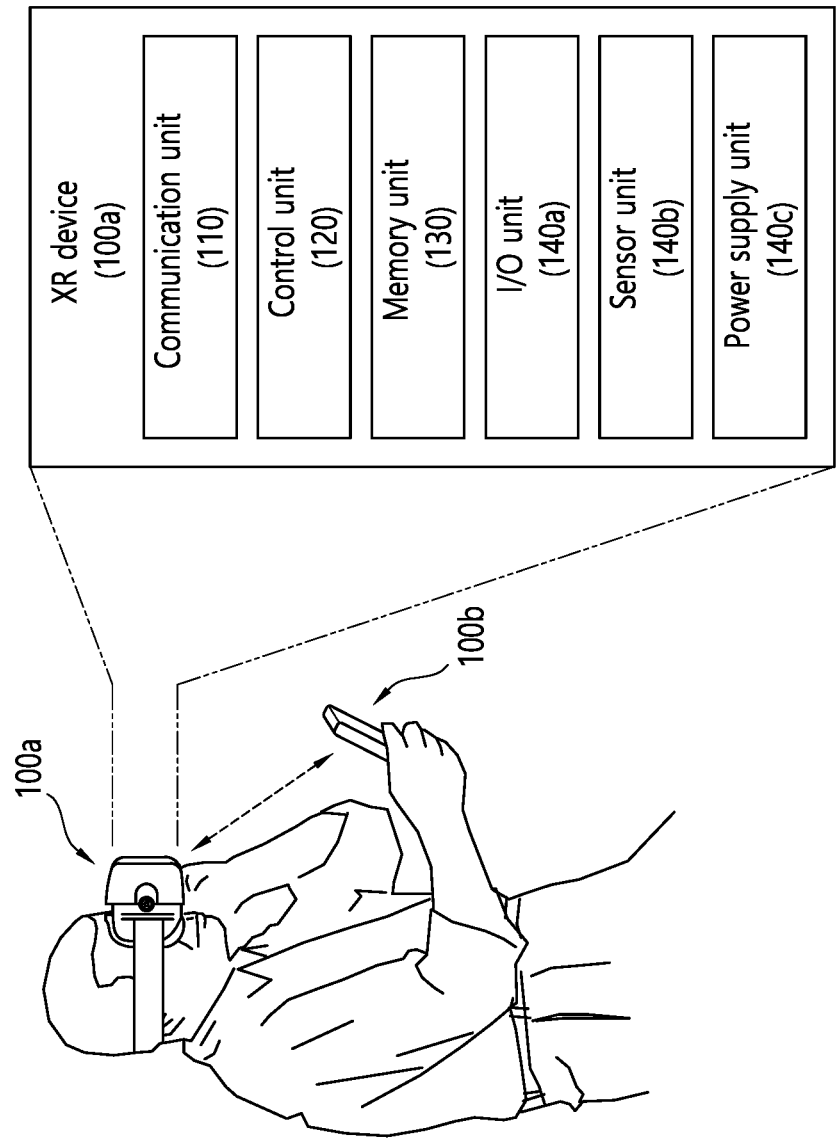
FIG. 29 shows an XR device applied to the present disclosure.

FIG. 29 shows an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 29, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 25, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Figure 30:
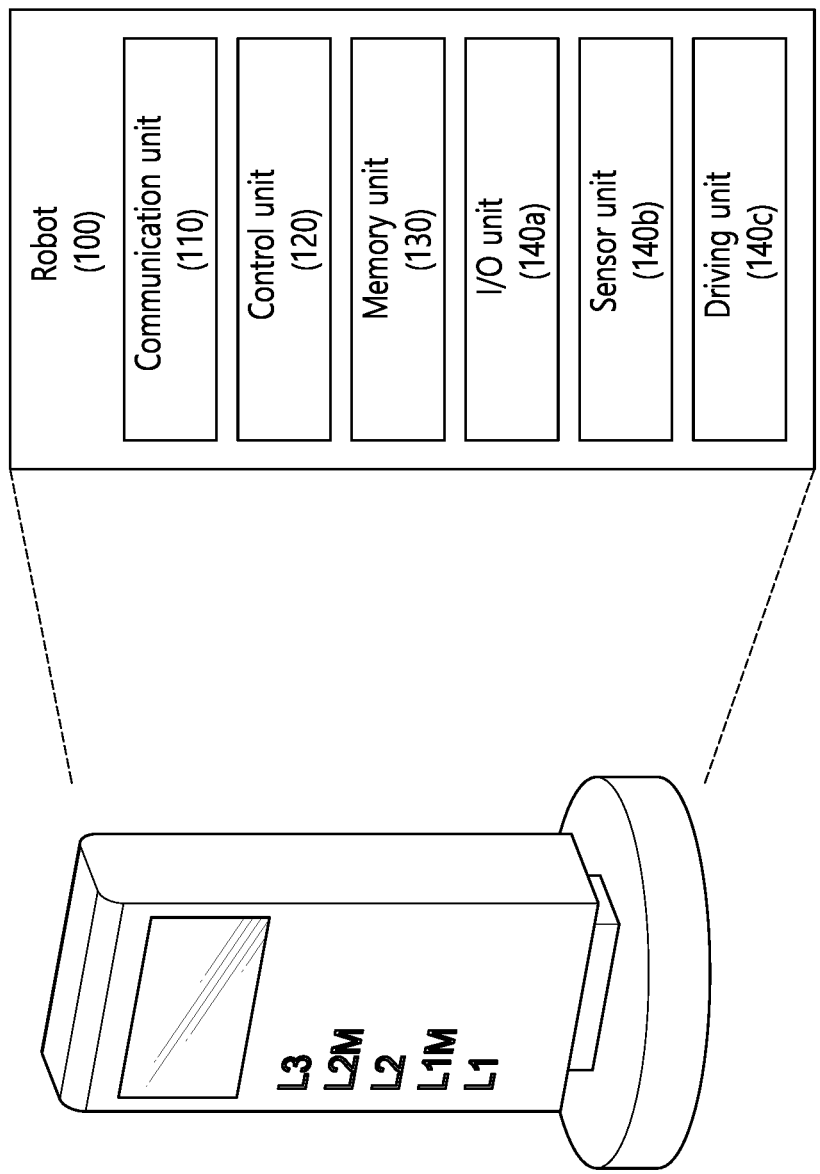
FIG. 30 shows a robot applied to the present disclosure.

FIG. 30 shows a robot applied to the present disclosure. The robot may be categorized into an industrial robot, a medical robot, a household robot, a military robot, etc., according to a used purpose or field.

Referring to FIG. 30, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 25, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Figure 31:
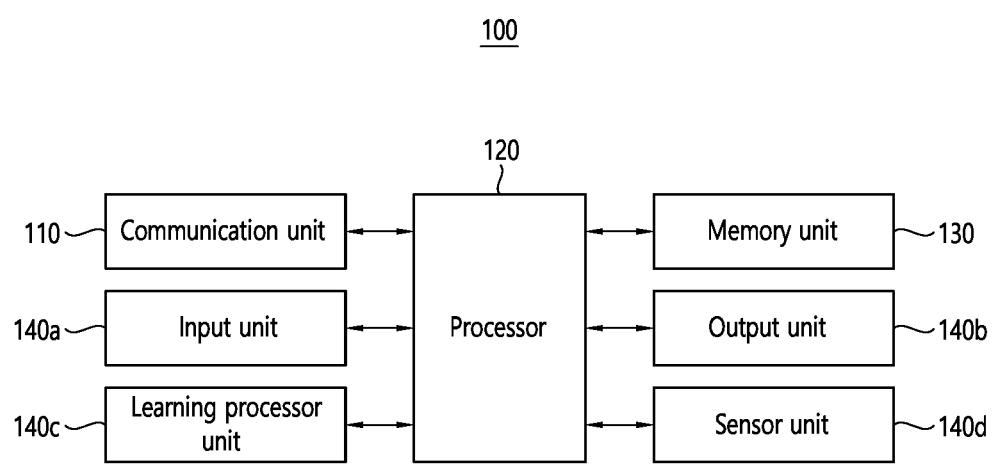
FIG. 31 shows an AI device applied to the present disclosure.

FIG. 31 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 31, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 25, respectively.

The communication unit 110 may transmit and receive wired/radio signals (e.g., sensor information, user input, learning models, or control signals) to and from external devices such as other AI devices (e.g., 100x, 200, or 400 of FIG. 22) or an AI server (e.g., 400 of FIG. 22) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 22). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 22). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

What is claimed is:

1. A method for performing, by a first device (100), sidelink communication, the method comprising:
    obtaining configuration information related to multiple bandwidth parts (BWPs) included in a first carrier;
    obtaining configuration information related to multiple BWPs included in a second carrier;
    performing a first channel busy ratio (CBR) measurement for one or more BWPs related to a first sidelink service, among the multiple BWPs included in the first carrier;
    determining a CBR value of the first carrier, based on first CBR measurement values for one or more BWPs related to the first sidelink service, among the multiple BWPs included in the first carrier;
    performing a second CBR measurement for one or more BWPs related to the first sidelink service, among the multiple BWPs included in the second carrier;
    determining a CBR value of the second carrier, based on second CBR measurement values for one or more BWPs related to the first sidelink service, among the multiple BWPs included in the second carrier; and
    selecting the first carrier, based on the CBR value of the first carrier and the CBR value of the second carrier,
    wherein the CBR value of the first carrier and the CBR value of the second carrier are equal to or less than a CBR threshold value related to the first sidelink service, and
    wherein the CBR value of the first carrier is smaller than the CBR value of the second carrier.

2. The method of claim 1, wherein the first CBR measurement is performed for one or more BWPs configured by a base station, among the multiple BWPs included in the first carrier.

3. The method of claim 1, wherein the first CBR measurement is performed for one or more BWPs being configured to have a highest priority level for the first sidelink service, among the multiple BWPs included in the first carrier.

4. The method of claim 1, wherein the first CBR measurement is performed for one or more BWPs being related to a specific numerology, among the multiple BWPs included in the first carrier.

5. The method of claim 1, wherein the first CBR measurement is performed for one or more BWPs through which a preconfigured channel or a preconfigured signal is transmitted, among the multiple BWPs included in the first carrier.

6. The method of claim 1, wherein the first CBR measurement is performed for a synchronization reference BWP, among the multiple BWPs included in the first carrier.

7. The method of claim 1, wherein the first CBR measurement is performed for one or more BWPs having no preconfigured radio access technology (RAT) detected therefrom, among the multiple BWPs included in the first carrier.

8. The method of claim 1, wherein the first CBR measurement is performed for one or more BWPs being selected based on a channel occupancy ratio (CR) value, among the multiple BWPs included in the first carrier.

9. The method of claim 1, wherein, among the first CBR measurement values for the one or more BWPs, a minimum value is determined as the CBR value of the first carrier.

10. The method of claim 1, wherein, among the first CBR measurement values for the one or more BWPs, a maximum value is determined as the CBR value of the first carrier.

11. The method of claim 1, further comprising:
    transmitting the first sidelink service to a second device (200) through a BWP having a smallest CBR value, among the one or more BWPs related to the first sidelink service included in the first carrier.

12. The method of claim 1, further comprising:
    transmitting the first sidelink service to a second device (200) through a BWP having a lowest index, among the one or more BWPs related to the first sidelink service included in the first carrier.

13. A first device (100) adapted to perform wireless communication, the first device comprising:
    at least one transceiver;
    at least one processor; and
    at least one memory connected to the at least one processor and storing instructions that, based on being executed, cause the first device (100) to perform operations comprising:
    obtaining configuration information related to multiple bandwidth parts (BWPs) included in a first carrier;
    obtaining configuration information related to multiple BWPs included in a second carrier;
    Performing a first channel busy ratio (CBR) measurement for one or more BWPs related to a first sidelink service, among the multiple BWPs included in the first carrier;
    determining a CBR value of the first carrier, based on first CBR measurement values for one or more BWPs related to the first sidelink service, among the multiple BWPs included in the first carrier;
    performing a second CBR measurement for one or more BWPs related to the first sidelink service, among the multiple BWPs included in a second carrier;
    determining a CBR value of the second carrier, based on second CBR measurement values for one or more BWPs related to the first sidelink service, among the multiple BWPs included in the second carrier; and
    selecting the first carrier, based on the CBR value of the first carrier and the CBR value of the second carrier,
    wherein the CBR value of the first carrier and the CBR value of the second carrier are equal to or less than a CBR threshold value related to the first sidelink service, and
    wherein the CBR value of the first carrier is smaller than the CBR value of the second carrier.

14. A processing device adapted to control a first device to perform wireless communication, the processing device comprising:
    at least one processor; and
    at least one memory connected to the at least one processor and storing instructions that, based on being executed, cause the at least one processor to perform operations comprising:

obtaining configuration information related to multiple bandwidth parts (BWPs) included in a first carrier;

obtaining configuration information related to multiple BWPs included in a second carrier;

performing a first channel busy ratio (CBR) measurement for one or more BWPs related to a first sidelink service, among the multiple BWPs included in the first carrier;

determining a CBR value of the first carrier, based on first CBR measurement values for one or more BWPs related to the first sidelink service, among the multiple BWPs included in the first carrier;

performing a second CBR measurement for one or more BWPs related to the first sidelink service, among the multiple BWPs included in a second carrier;

determining a CBR value of the second carrier, based on second CBR measurement values for one or more BWPs related to the first sidelink service, among the multiple BWPs included in the second carrier; and selecting the first carrier, based on the CBR value of the first carrier and the CBR value of the second carrier, wherein the CBR value of the first carrier and the CBR value of the second carrier are equal to or less than a CBR threshold value related to the first sidelink service, and wherein the CBR value of the first carrier is smaller than the CBR value of the second carrier.

* * * * *